US006426776B1

(12) United States Patent
Ochi

(10) Patent No.: US 6,426,776 B1
(45) Date of Patent: Jul. 30, 2002

(54) APPARATUS FOR AND METHOD OF PHOTOGRAPHING USING SCANNING TECHNIQUES

(75) Inventor: Keizou Ochi, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/039,787

(22) Filed: Mar. 16, 1998

(30) Foreign Application Priority Data

| Mar. 18, 1997 | (JP) | ............................................. | 9-064357 |
| Nov. 11, 1997 | (JP) | ............................................. | 9-308253 |
| Nov. 11, 1997 | (JP) | ............................................. | 9-308254 |
| Nov. 11, 1997 | (JP) | ............................................. | 9-308255 |

(51) Int. Cl.[7] ........................... H04N 3/08; H04N 5/222
(52) U.S. Cl. ...................... 348/370; 348/203; 348/370; 348/371
(58) Field of Search ................................ 348/370, 371, 348/207, 98, 68, 96, 97, 195, 203, 205; 358/474, 475, 505, 509; 235/462.42; 600/109

(56) References Cited

U.S. PATENT DOCUMENTS

| 4,782,386 A | * | 11/1988 | Ams et al. ................... 348/371 |
| 5,097,340 A | * | 3/1992 | Tanabe et al. .............. 348/371 |
| 5,646,683 A | * | 7/1997 | Motta .......................... 348/203 |
| 5,655,170 A | * | 8/1997 | Yamamoto et al. ......... 348/207 |

FOREIGN PATENT DOCUMENTS

JP          6-164953          6/1994

* cited by examiner

Primary Examiner—Wendy R. Garber
Assistant Examiner—Rashann N. Tillery
(74) Attorney, Agent, or Firm—Sidley Austin Brown & Wood LLP

(57) ABSTRACT

An apparatus for obtaining a two-dimensional image of an object by means of an image sensor and a scanning mechanism is provided with a light source for emitting light for irradiating the object. The light source is lighted in response to a request made by a CPU for the commencement of photographing and is allowed to go out after the termination of photographing.

41 Claims, 31 Drawing Sheets

APPARATUS FOR AND METHOD OF PHOTOGRAPHING USING SCANNING TECHNIQUES

BACKGROUND OF THE INVENTION

This application is based on Japanese Patent Applications No. 09-064357 filed on Mar. 18, 1997, No. 09-308253 filed on Nov. 11, 1997, No. 09-308254 filed on Nov. 11, 1997, and No. 09-308255 filed on Nov. 11, 1997, the contents of which are incorporated herein by reference.

1. Field of the Invention

This invention relates to apparatus for and method of obtaining a two-dimensional image of an object by means of an image sensor and a scanning mechanism. Such apparatus and method are especially applied to a digital camera for photographing an object by means of a one- or two-dimensional image pickup device such as a CCD image sensor.

2. Description of the Prior Art

Portable digital cameras are now on the market as one of the simplest types of image input means for individual use. Certain of the digital cameras devised heretofore incorporate two-dimensional image pickup devices (i.e., area sensors), incorporate flash lamps to take a photograph with a blare of flashlight in the same way as cameras for silver halide films. Others of the digital cameras are called line sensor cameras because they incorporate one-dimensional image pickup devices (i.e., line sensors) combined with auxiliary scanning mechanisms such as means for rotating a mirror, whereby higher resolution may be obtained as compared with the case where a digital camera incorporating an area sensor is used. The resolution which can be obtained by the line sensor camera is such that a document appearing in a sheet of paper which is the size of DIN A4 can be legibly photographed.

In order to prevent an image from being distorted by irregular speed of displacement or revolution which occurs in an auxiliary scanning mechanism, it is known to detect the position of a moving part or the angular position of revolving part of the auxiliary scanning mechanism and adjust the timing of allowing a light from an object to be incident on each line. Irregular driving inevitably occurs to some extent, because the auxiliary scanning mechanism includes a mechanical drive mechanism such as means for rotating the mirror or means for moving a line sensor. Consequently, the image is distorted when the scan operation in order of successive lines is carried out with a fixed period, because the range which comes within the sweep of the line sensor varies with lines. The image expands when the object is scanned at a speed lower than the standard scanning speed, and contracts when the object is scanned at a speed higher than the standard scanning speed. This is the very reason why the timing of allowing the light from the object to be incident on each line is staggered in accordance with the irregularity of driving.

When all lines are scanned in consecutive order, longer time is required to photograph a frame. The longer the time required for photographing is, the more greatly the picture quality is affected by unintentional movement of the hands. Indeed the influence of unintentional movement of the hands will be mitigated by high-speed auxiliary scanning, but the high-speed auxiliary scanning will result in allotting only a short time for allowing the light from the object to be incident on each line such that, when the illuminance on the surface of the object is low, a decline in picture quality (i.e., signal-to-noise (S/N) ratio) will be caused by underexposure. Especially in case of indoor photographing, irregular color or photographic density will be caused by a flickering light source such as a fluorescent lamp.

There has been a prior proposal to cope with the aforesaid problem by the use of flashlight for a line sensor camera to make up for the shortage of illuminance. This prior proposal involves the emission of light having a truncated or flat-topped waveform. This light emission, which is hereinafter referred to as "flat-topped light emission", has been found advantageous when used for a line sensor camera so that the object may be illuminated over a period of about 1/10 second, i.e., over a period of time required for scanning a frame. An excellent photograph in which all lines have equal brightness is obtained when the speed of switching action is high enough to keep pace with a period with which the lines are scanned. However, it is difficult to keep the switching action accurate. It should also be realized that it would be expensive to use a super high-speed switching element.

When an area scanning digital camera incorporating an area sensor is adapted to be kept in a serial imaging mode of operation as long as a release button is pushed, the object has to be illuminated with a certain quantity of light so that all frames may receive an equal quantity of light over a period of time during which the serial imaging is carried out.

SUMMARY OF THE INVENTION

The primary object of the invention is to provide an apparatus for obtaining a two-dimensional image of an object free of underexposure irrespective as to whether an object is scanned in order of successive lines or subjected to area scanning.

Another object of the invention is to provide an apparatus for obtaining a two-dimensional image of an object which allows a photograph uniform in brightness to be taken without recourse to the high-speed switching of illumination.

Still another object of the invention is to provide an apparatus for obtaining a two-dimensional image of an object which is less susceptible to the influence of a change in the quantity of ambient light.

Yet still another object of the invention is to provide an apparatus for obtaining a two-dimensional image of an object capable of minimizing or eliminating noise interference resulting from the switching of illumination and tending to cause the degradation of an image.

A further object of the invention is to provide an apparatus for obtaining a two-dimensional image of an object capable of preventing an image from being distorted by irregular scanning speed at the time of scanning the object in order of successive lines.

According to the aspect of the invention, there is provided an apparatus for obtaining a two-dimensional image of an object by means of an image sensor and a scanning mechanism, comprising a controller for commencing photographing after lighting a light source in response to a request for the commencement of photographing, and for allowing said light source to go out after the termination of photographing.

DETAILED DESCRIPTION

Figure 1:
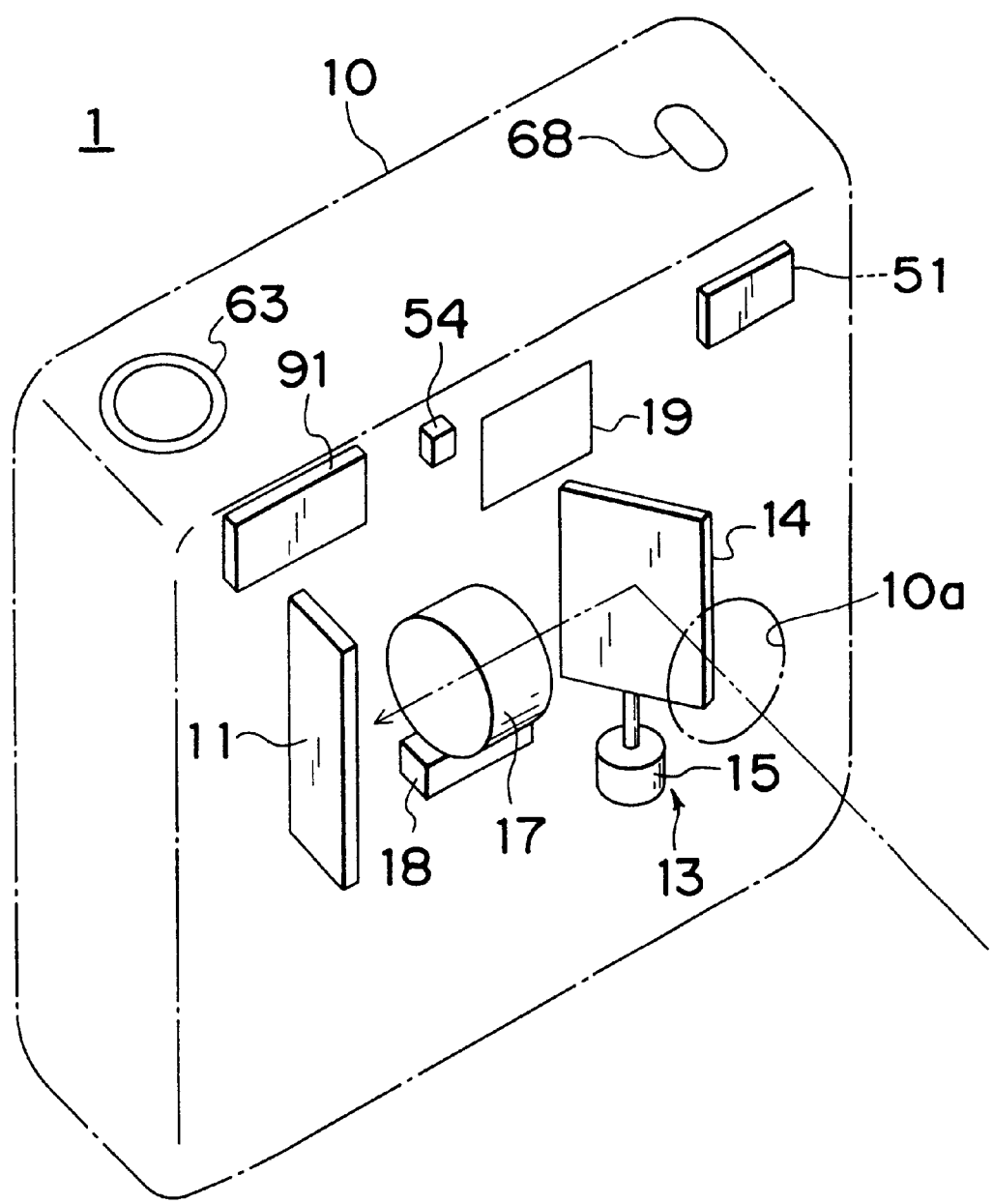
FIG. 1 is a view showing the component parts of a first preferred embodiment of the inventive digital camera.

An important feature of this invention is that the digital camera which is one of embodiments of the invention is provided with a light source for illuminating the object during photographing as occasion demands. The light source may be designed as an independent component to be disposed outwardly of the digital camera. Whether or not the object is to be illuminated depends on the brightness of the object, camera-to-object distance and selected mode of operation. For example, when a document is to be photographed, high-speed auxiliary scanning is selected so that the time required for photographing may be shortened. This is because, otherwise, the influence of unintentional movement of the hands is serious in this case as compared with the case where a landscape is photographed. It is desirable to illuminate the document in such a manner that a sufficient amount of exposure may be obtained in a short exposure time. The usefulness of illumination is also attained when an object other than a document is to be photographed in a poor light.

Proper exposure can be readily carried into effect if the illuminance of illumination is adapted to be varied to suit requirements. The illuminance of illumination is kept constant during photographing by measuring the luminance of the light source and adjusting the quantity of light emitted thereby. If the luminous intensity of the light beam striking the object is measured and the quantity of light emitted by the light source is adjusted, the undesirable effect of a change in the quantity of ambient light caused by a flickering light source such as a fluorescent lamp can be circumvented and the brightness of the object can be stabilized during photographing. In order that the results of measurement may not be affected by the distribution of luminous intensities of light beams striking the object, the quantity of the light beam striking the same portion on the surface of the object should be measured throughout the photographing or, alternatively, light-diffusing glass should be used so that the average quantity of light within a field angle may be measured. Nonlimiting examples of methods of measurement are an external comparison method and direct measurement using transistor-transistor logic (TTL).

Nonlimiting examples of light sources for illuminating the object with a sufficient amount of light over a period of time required for taking a picture by scanning the object in order of successive lines are an incandescent electric lamp and a discharge tube such as a xenon lamp. The discharge tube makes it possible to achieve desirable features such as excellent luminous efficiency, abrupt buildup of light emission, and compact arrangement requiring less space. The quantity of light emitted by the discharge tube can be controlled by the method of the aforesaid flat-topped light emission in the same manner as in silver photography, i.e., by supplying electric power intermittently by means of a switching element such as an insulated-gate bipolar transistor (IGBT).

Switching action for the flat-topped light emission is synchronized with the repetition of retrace intervals between successive lines or frames. When the digital camera is of the kind provided with means for adjusting the timing of commencing to scan a line in accordance with the detected position of an auxiliary scanning mechanism, illumination is switched on and off synchronously with the repetition of retrace intervals commenced at an instant determined by the adjusted timing. As a result of such synchronization, all lines and all frames are allowed to have nearly equal brightness. In order to prevent an image from being degraded by noise interference resulting from the switching of illumination, switching action is effected during retrace time when the picture signal is not taken out of an image pickup device.

In one described embodiment, light emission is allowed to take place twice or more for each line so as to improve picture quality by making the luminous intensity uniform throughout the photographing. Especially when the photographing is carried out with an auxiliary scanning mechanism continuously driven, uniform luminous intensity allows the aperture of the image pickup device to approach a most favorable shape.

Referring now to FIG. 1, a digital camera 1 is a portable digital image input means. In the front wall of a housing 10, the digital camera 1 has a window 10a for the reception of incident light from an object. Upon striking a mirror 14 disposed inwardly of the window 10a, the light beam is reflected to an image-forming lens assembly 17 and directed to a line sensor 11. This arrangement allows the housing 10 to have less dimension in the direction of incident light from the object.

The line sensor 11 with picture elements arranged vertically is a color image pickup device consisting of a CCD array. By the line sensor 11, a projected image is decomposed into red, green and blue and converted into electric signals. Instead of the CCD image sensor used in this embodiment, it is also possible to use other image pickup devices such as a MOS image sensor.

The mirror 14 and a motor 15 constitute an auxiliary scanning mechanism 13. A shaft from the motor 15, by which the mirror 14 is carried, has an axis running parallel with a direction in which the picture elements are arranged on the line sensor 11, i.e., with a direction in which the main scanning is carried out. As the mirror 14 rotates, the object is scanned in an auxiliary scanning direction which is perpendicular to the main scanning direction. Thus the object is projected on one line after another on the light-receiving surface of the line sensor 11. The field angle in the auxiliary scanning direction depends on an angle at which the mirror 14 can rotate. Instead of the foregoing auxiliary scanning mechanism, it is also possible to use a linear scan method which resides in displacing the line sensor 11 in horizontal directions.

The lens assembly 17 is of an internal focusing type, i.e., it utilizes a portion of incident light for automatic focusing (AF). An actuator 18, which is provided for electrically-driven zooming, has a built-in encoder for indicating the position of a movable lens. The digital camera 1 further includes an optical view finder 19.

A photometric sensor 51, range-finding sensor 54 and light source 91 for illumination (such as a xenon lamp) are mounted on the front wall of the housing 10 in the upper end portion thereof. A release button 63 and a mode switch 68 are disposed on the top surface. The mode switch 68 is used for making a switchover of the mode of operation according to whether the digital camera 1 is going to be used for photographing a document or a landscape. A pack of batteries (not shown) is enclosed in a suitable box provided in the rear of the housing 10. A main switch (not shown) is also disposed at the rear of the housing 10.

Figure 2:
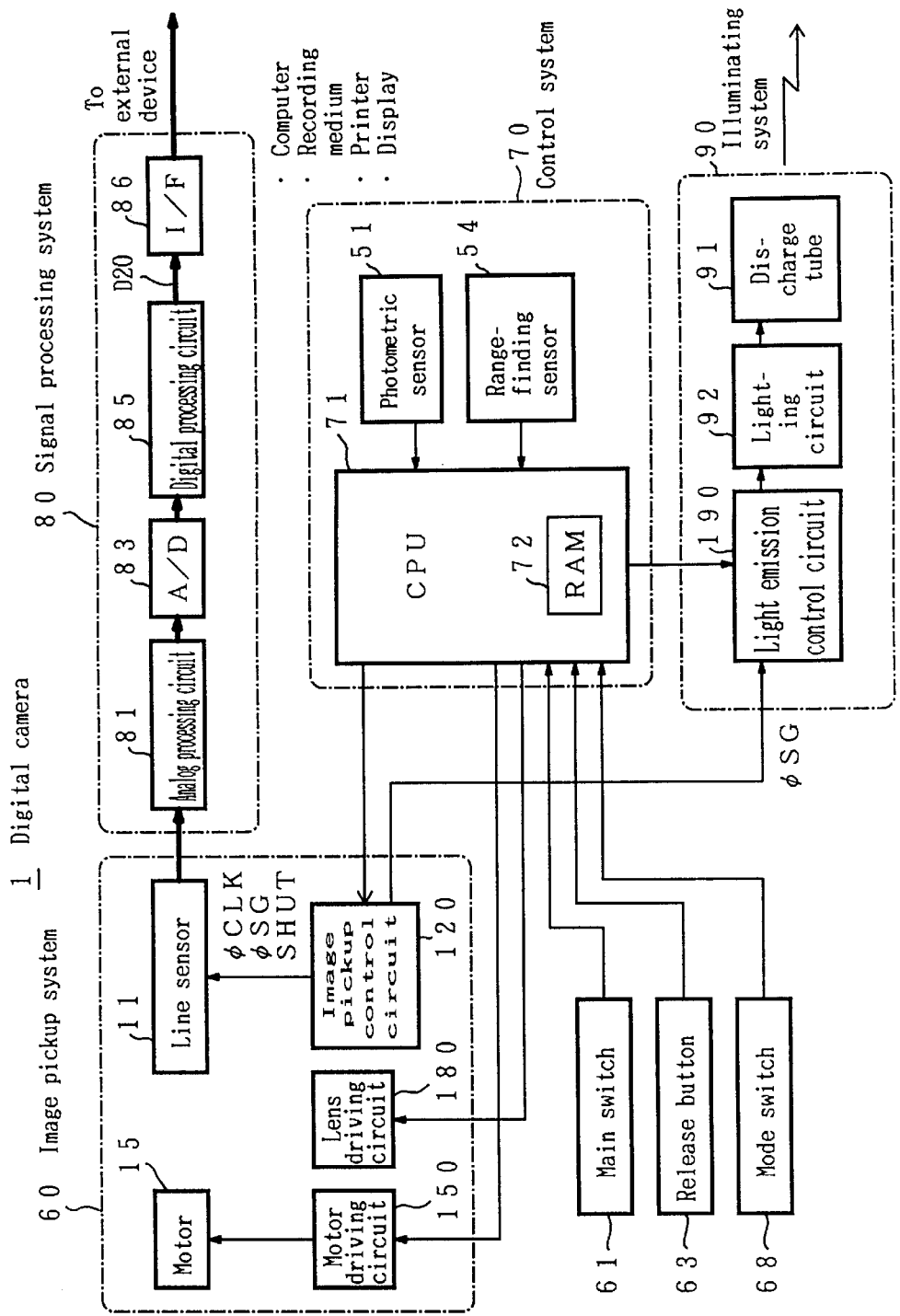
FIG. 2 is a block diagrammatic representation thereof.

Referring now to FIG. 2, the digital camera 1 comprises an image pickup system 60 for scanning the object in order of successive lines, a signal processing system 80 for outputting a prescribed form of data on photographing, a control system 70, a principal part of which is a CPU 71 consisting of a microprocessor, and an illuminating system 90 for optimizing the brightness of the object.

The image pickup system 60 comprises the line sensor 11, motor 15, motor driving circuit 150, lens driving circuit 180 and image pickup control circuit 120. The last mentioned circuit transmits signals (such as φCLK and φSG appearing hereinafter) to the line sensor 11.

The signal processing system 80 comprises an analog processing circuit 81 for amplifying an input signal, an analog-to-digital (A/D) converter 83 for sampling and holding the amplified photoelectric transfer signal and converting it into a data on photographing having the prescribed number of bits, e.g., 8 bits, a digital processing circuit 85 for correcting the image, and an interface 86 for transmitting the processed data D20 on photographing to an external device such as an image editing device, storage medium or image output unit. Alternatively, the digital camera 1 may have a built-in storage medium so as to be allowed to store information on the photographing. In this case, the information is transmitted to an external device either by data communication or by the delivery of a recording medium.

The illuminating system 90 comprises a xenon lamp 91, lighting circuit 92 and light emission control circuit 190. Except where the object need not be illuminated, information on the quantity DL of light to be emitted by the xenon lamp 91 is provided from the CPU 71 to the light emission control circuit 190. The image pickup control circuit 120 transmits retrace pulses φSG to the light emission control circuit 190. The function of the retrace pulses φSG is to synchronize the switching action for the xenon lamp 91 with the repetition of retrace intervals between successive lines.

Figure 3:
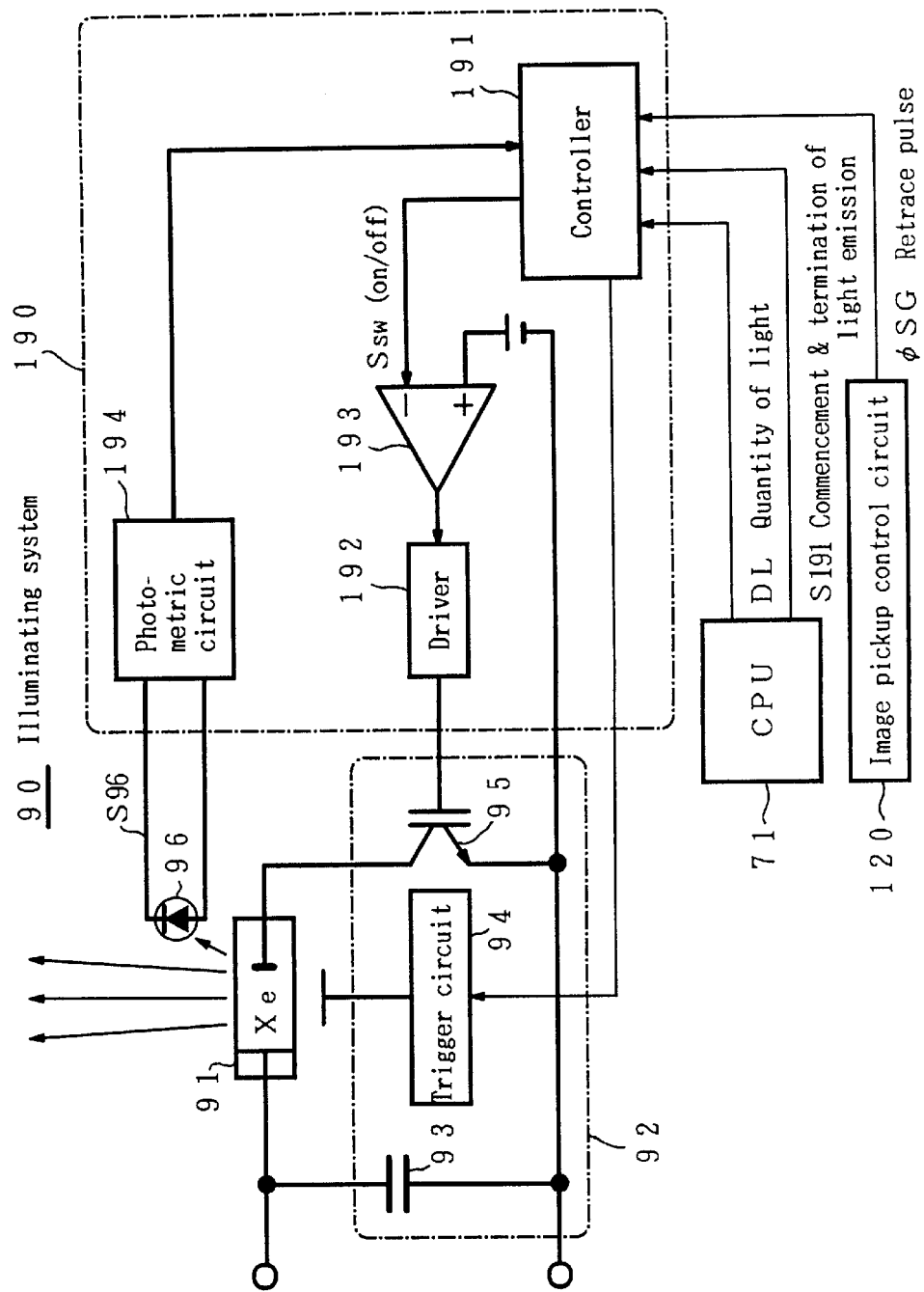
FIG. 3 is a diagrammatic view of the electrical circuit for an illuminating system incorporated therein.

FIG. 3 illustrates the illuminating system 90 somewhat more completely, including particularly the lighting circuit 92. As shown therein, the lighting circuit 92 comprises a capacitor 93 in which the necessary electrical energy for causing arc discharge in the xenon lamp 91 is stored, a trigger circuit 94 for actuating the xenon lamp 91 to strike an arc therein, and an IGBT 95 arranged to interrupt the circuit to the xenon lamp 91. The light emission control circuit 190 comprises a controller 191, switching driver 192, comparator 193 and photometric circuit 194. In order to allow all lines to have uniform brightness, a change in the quantity of light used for illumination is synchronized with the repetition of retrace intervals between successive lines. This important facet of the digital camera 1 obviates the necessity of providing a superhigh-speed switching element which would be required if the illuminance of illumination were to be kept constant.

The manner in which the illuminating system 90 works will now be described. A request from the CPU 71 for light emission takes the form of a signal S191, in response to which the controller 191 transmits a control signal $S_{sw}$ to the comparator 193 for actuating the IGBT 95 and another control signal to the trigger circuit 94 for causing the xenon lamp 91 to commence arc discharge. A portion of light emitted thereby is incident on a photosensor 96, which transmits a signal S96 to the controller 191 through the photometric circuit 194. The signal S96 has a signal level proportional to the luminous intensity of the light detected by the photosensor 96. The controller 191 terminates transmission of the control signal $S_{SW}$ when the luminous intensity comes up to an upper limit which has been set in accordance with the aforesaid quantity DL of light to be emitted by the xenon lamp 91. A change in the output state of the comparator 193 takes place, and the switching driver 192 allows the IGBT 95 to change from conducting to non-conducting state. When light emission is repeated during the time when a single line is scanned as will appear hereinafter, transmission of the control signal $S_{SW}$ is resumed at the moment when the luminous intensity comes down to a lower limit. Thereafter, switching action to which the IGBT 95 is subjected is controlled so as to allow the luminous intensity to fall within a predetermined range. The illuminating system 90 need not include the photosensor 96 and the photometric circuit 194 when the digital camera 1 is of the kind provided with means operable such that the luminous intensity of light emitted by the xenon lamp 91 is adjusted in accordance with a change in the quantity of ambient light. In this case, a signal derived from the photometric sensor 51 is fed to the controller 191 in place of the signal S96. This substitute signal has a signal level proportional to an output taken from the photometric sensor 51 and indicates the luminous intensity of the light beam striking the object, i.e., the sum of the luminous intensity of ambient light and the luminous intensity of light emitted by the xenon lamp 91.

Figure 4:
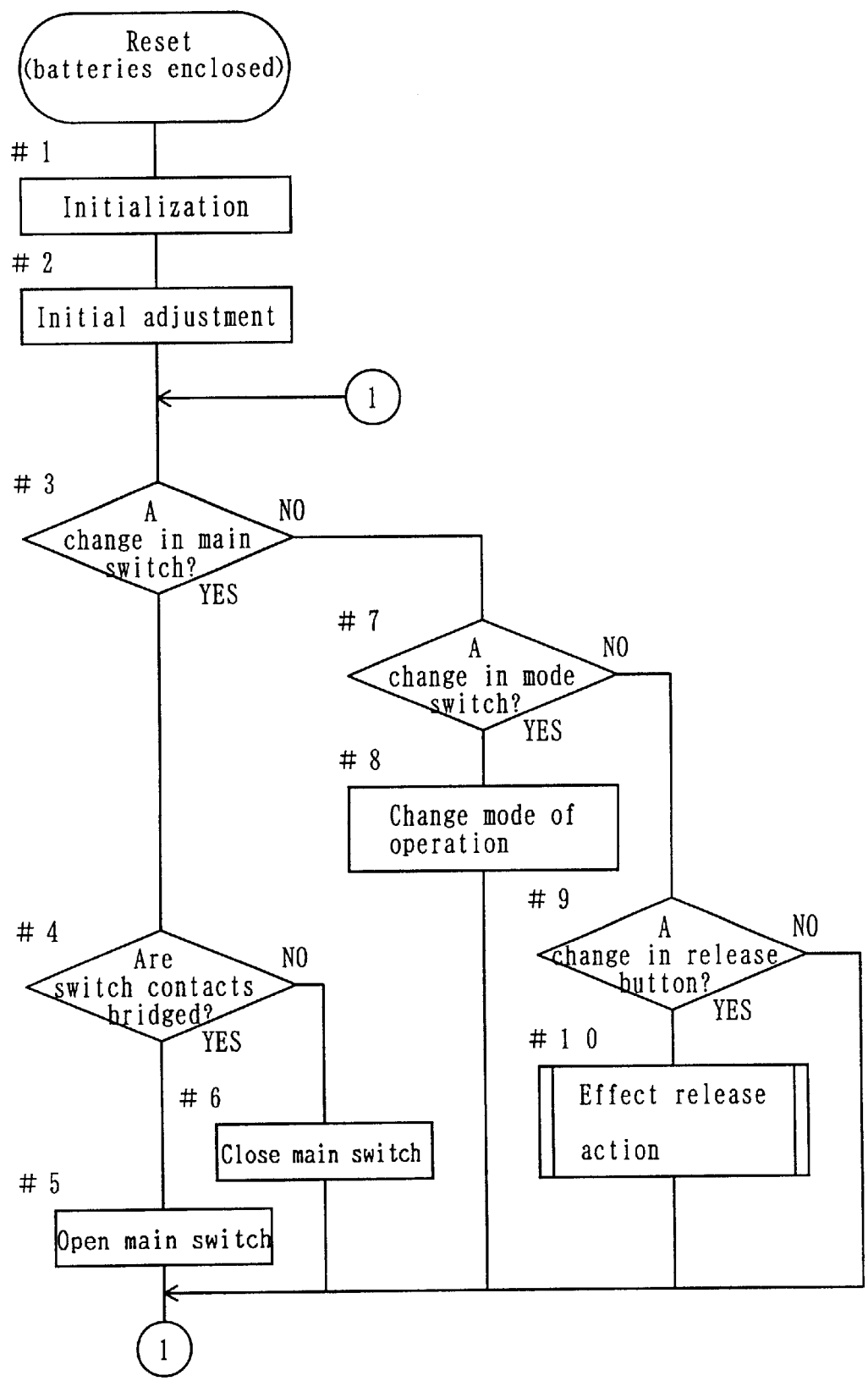
FIG. 4 is a flow diagram representing successive steps in a typical operation of a CPU incorporated in a control system.

For a more complete understanding of the successive steps in a typical operation of the CPU 71, reference may be had to FIG. 4.

When a connection has been established to a source energy such as a battery, the CPU 71 initializes control registers (step 1), subjects controlled systems to initial adjustment (step 2), and awaits manipulation of switches.

The main switch 61 is opened when it is operated while the switch contacts are bridged, and is closed when it is operated while the switch contacts are broken (steps 3 to 6). The mode of operation will change from photographing a document to photographing a landscape and vice versa every time the mode switch 68 is operated while the switch contacts of the main switch 61 are bridged (steps 7 and 8). Release action is effected when the release button 63 is pushed down to commence photographing (steps 9 and 10).

Figure 5:
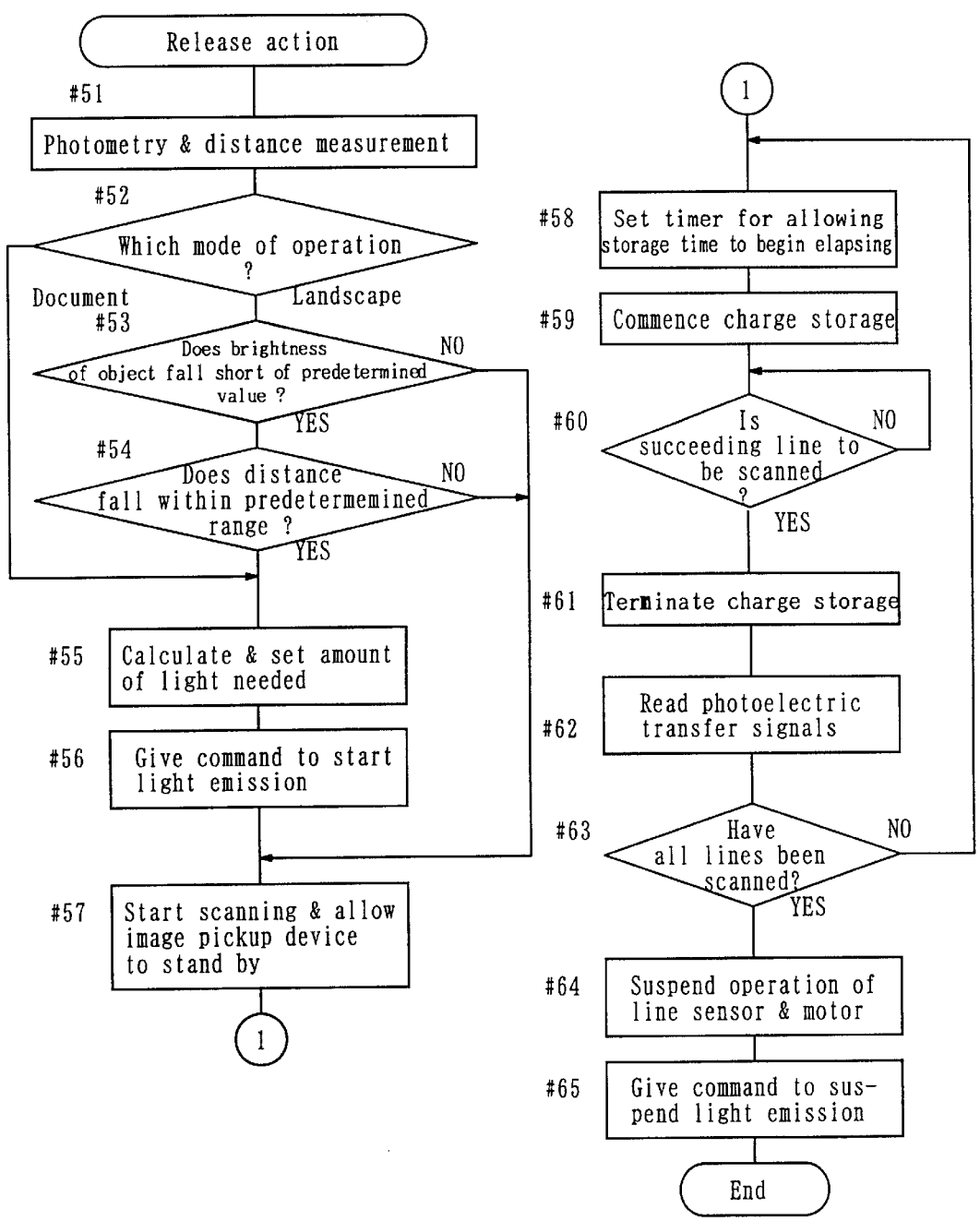
FIG. 5 is a detail flow diagram showing a portion of FIG. 4 in connection with release action.

FIG. 5 is a detail showing a portion of FIG. 4 in connection with the release action.

An output is fetched from the photometric sensor 51 for measuring the brightness of the object before an arc is struck in the xenon lamp 91. In order to measure the camera-to-object distance, an output is fetched from the range-finding sensor 54 (step 51). The mode of operation is checked (step 52). Unintentional movement of the hands at the time of photographing a document affects picture quality more seriously than that at the time of photographing a landscape. When photographing a document, therefore, one might as well select the document mode in which auxiliary scanning is carried out at high speed such that the influence of unintentional movement of the hands is mitigated. When the document mode is selected, the processing proceeds to step 55 with steps 53 and 54 skipped. This is because the document mode is invariably attended by illumination to raise S/N ratio. In accordance with the results of photometry and distance measurement, and with a view to allowing neither over- nor underexposure to occur, the quantity DL of light to be emitted by the xenon lamp 91 is calculated. The value obtained from this calculation is provided to the controller 191. When the landscape mode is selected, the aforesaid quantity DL is likewise calculated if the brightness of the object falls short of a predetermined value and if the camera-to-object distance falls within a predetermined range, i.e., if photographic conditions require illumination and are adapted to make good use of the same (steps 53 to 55). In either case, when an arc is to be struck in the xenon lamp 91, a command to start light emission is given to the controller 191 after providing the aforesaid quantity DL to the controller 191 (step 56). Commands to start photographing are given to the motor driving circuit 150 and the image pickup control circuit 120 respectively (step 57).

Then a timer 0 (FIG. 8) is set to provide a certain time period, at the end of which integration time is to be allowed to begin elapsing in the CCD during the time 1H (step 58). The CCD begins to store charge at the moment when the time which has been set in the timer 0 is up (step 59). Integration in the CCD comes to an end at the moment when the retrace time is commenced (i.e., when the leading edge of a retrace pulse φSG is encountered)(steps 60 and 61). Photoelectric transfer signals for the line which has just been scanned are taken out of the line sensor 11 (step 62). Steps 58 to 62 are repeated until the prescribed number of lines are scanned (step 63). Then the operation of the line sensor 11 and motor 15 is suspended (step 64), and a command to suspend light emission is given to the controller 191 (step 65).

Figure 6:
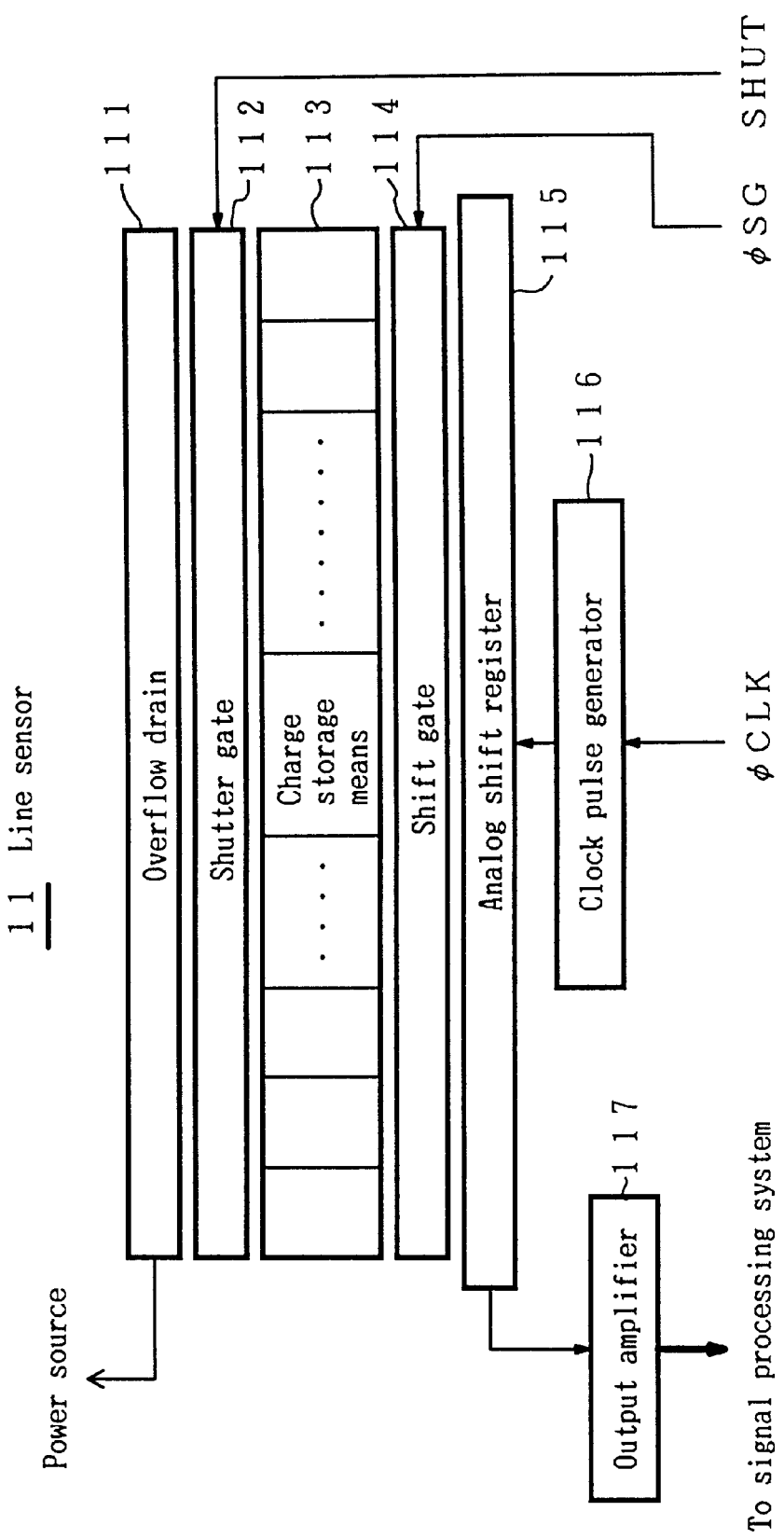
FIG. 6 is a schematic showing of a layout with several parts combined into a line sensor.

An important feature of the digital camera 1 is that, in order to obtain a photograph uniform in brightness, switching action to which the IGBT 95 is subjected is synchronized with the manner in which the line sensor 11 works. The following description is given as nonlimiting examples of control over light emission associated with the manner in which the line sensor 11 works:

As shown in FIG. 6, the line sensor 11 comprises an overflow drain 111, shutter gate 112, charge storage means 113, shift gate 114, analog shift register 115, clock pulse generator 116 and output amplifier 117.

Figure 7:
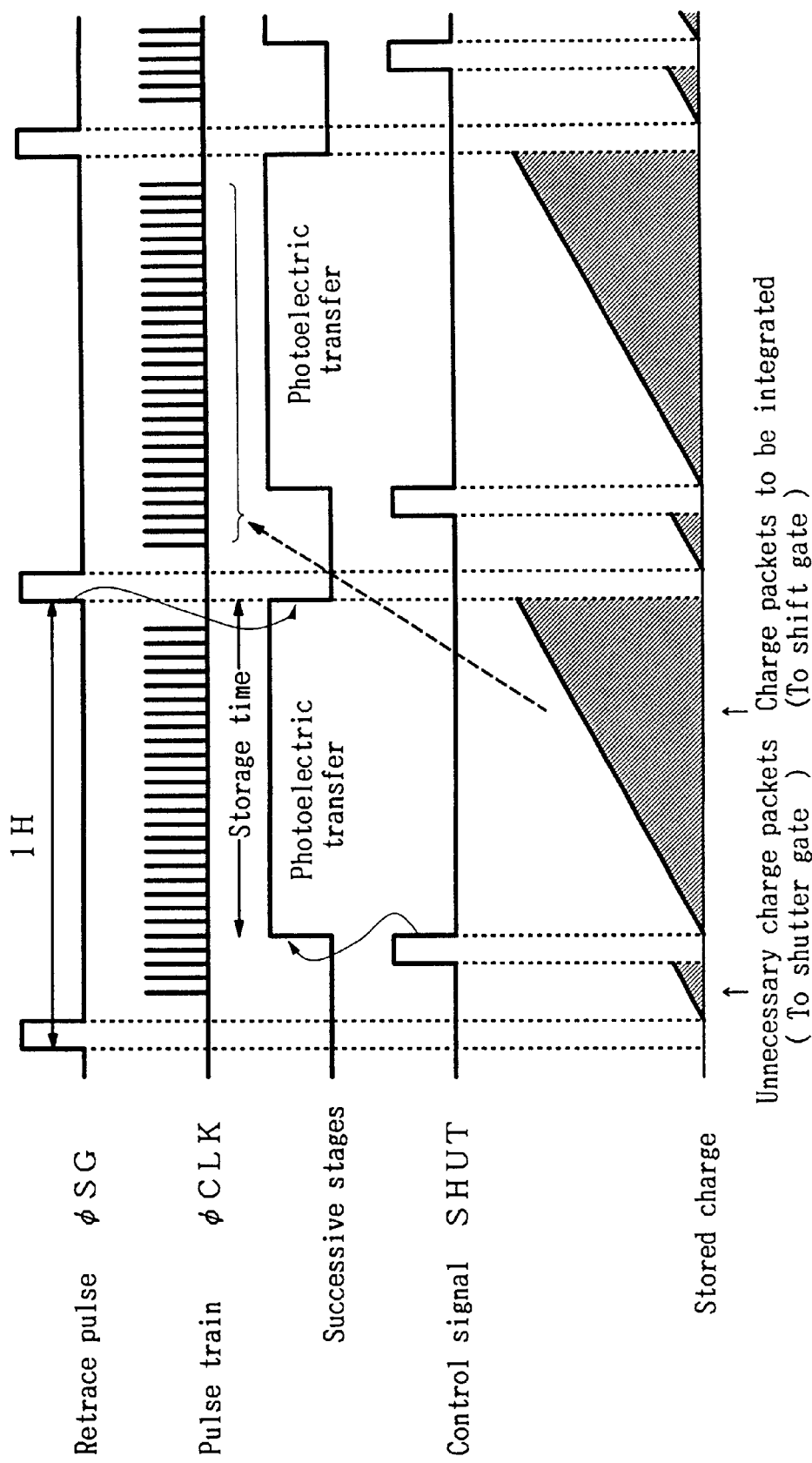
FIG. 7 is a time sequence diagram useful in understanding the operation thereof.

Upon receipt of a control signal SHUT, the shutter gate 112 allows an unnecessary charge packet or packets to move to the overflow drain 111 so that integration time to be allowed to elapse in the CCD during the time 1H (FIG. 7) may be varied to suit requirements. By the expression "storage time" as used in FIG. 7 is meant a period of time defined by the trailing edge of the control signal SHUT and the leading edge of the retrace pulse φSG. The time 1H required for scanning a line is determined by adjacent retrace pulses φSG. Every time the shift gate 114 receives a retrace pulse φSG from the image pickup control circuit 120, the charge stored during the storage time is removed from the charge storage means 113 and applied to the analog shift register 115, from which the charge is applied to the output amplifier 117 in synchronism with a pulse train φCLK and in order of picture elements arranged on the line sensor 11. The output amplifier 117 outputs photoelectric transfer signals to the signal processing system 80. As indicated by an inclined arrow in FIG. 7, the readout from a line is commenced in response to a retrace pulse φSG received at the end of the scanning of the line.

Referring in more detail to the manners in which light emission is controlled, reference should be made to FIGS. 8 to 13.

Figure 8:
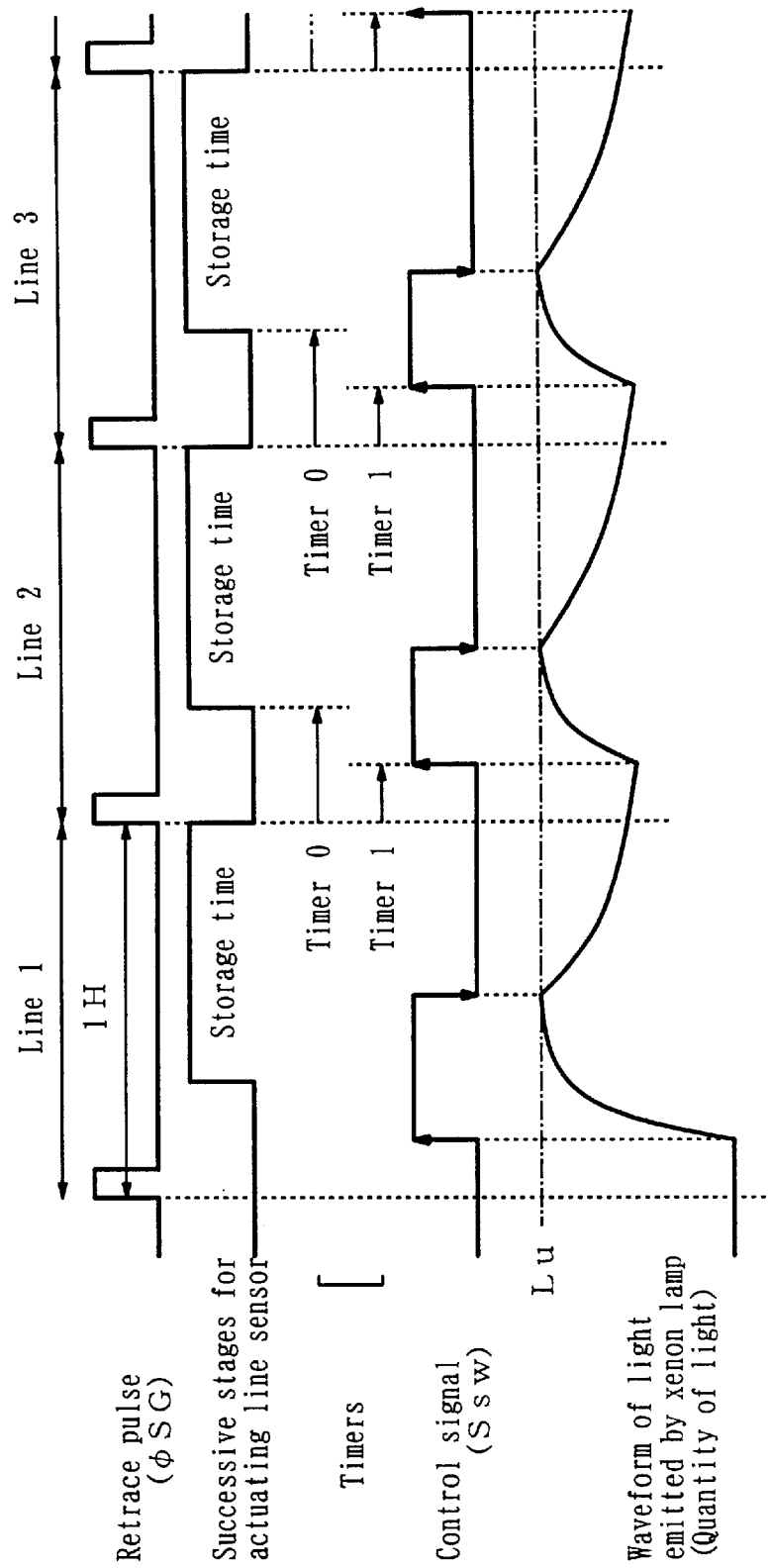
FIG. 8 is a time sequence diagram useful in understanding a manner in which light emission is controlled, wherein light emission is effected once for each line and a change in the quantity of ambient light is not taken into account.

In case of the control method shown in FIG. 8, light emission begins with the IGBT 95 changed from non-conducting to conducting state by a retrace pulse φSG. The IGBT 95 changes conversely when the quantity of light emitted by the xenon lamp 91 comes up to an upper limit Lu. The quantity of light is gradually attenuated. Thus the object is illuminated by the electro-luminescence and afterglow of the xenon lamp 91. From the second line on, the proper time sequencing of the operation of the IGBT 95 is controlled by a timer 1. In order to obtain suitable luminous intensity during the storage time, the attenuation characteristics of the afterglow of the xenon lamp 91 are taken into account in determining the time to be set in the timer 1. When the line 1 is to be scanned, the retrace pulse φSG may immediately cause the conductive state of the IGBT 95. Alternatively, a third timer may be installed, which allows the IGBT 95 to remain non-conductive for a specified amount of time before allowing the same to automatically change to conductive state. The aforesaid specified amount of time may be determined in accordance with the buildup of light emission.

Figure 9:
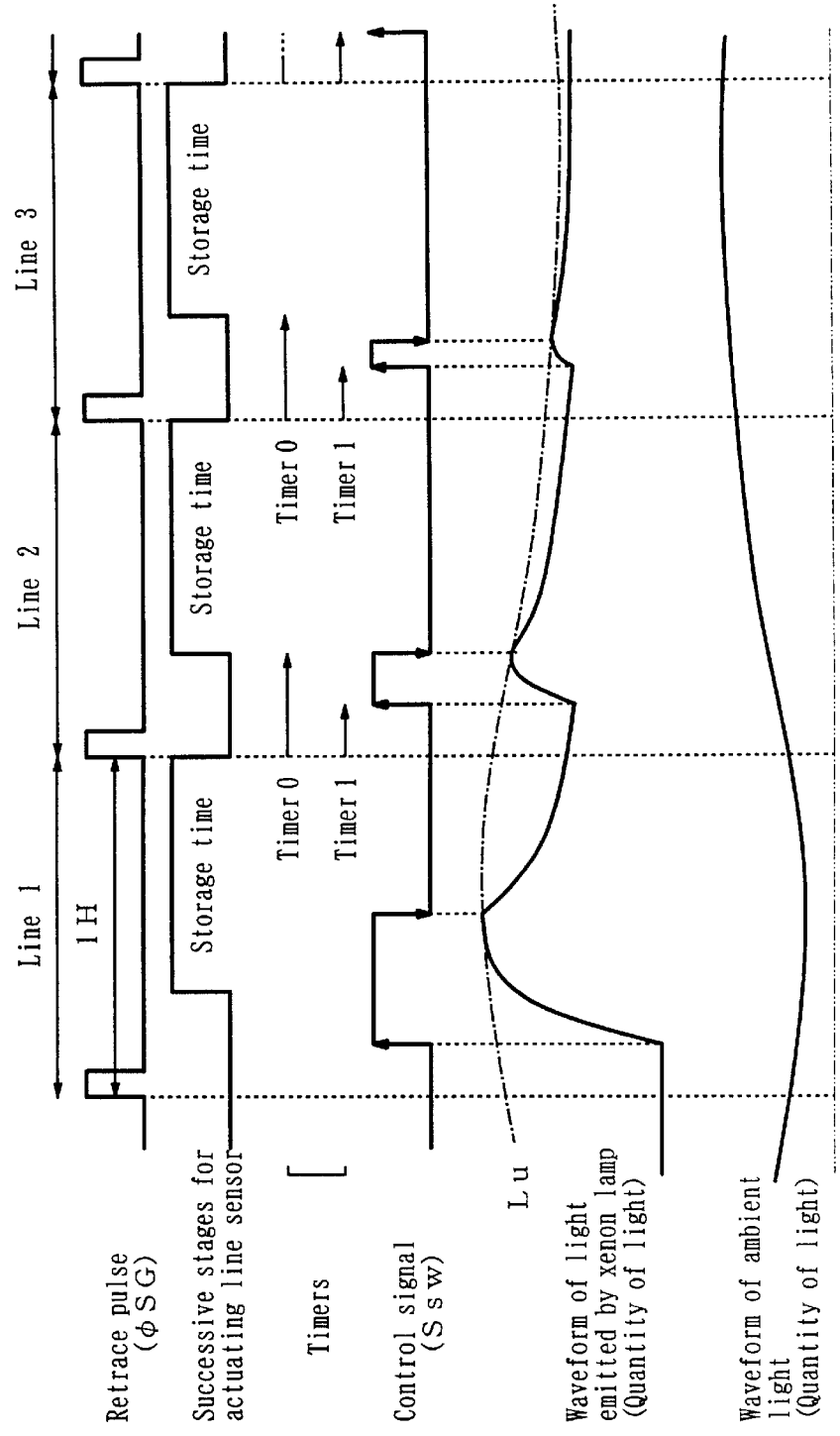
FIG. 9 is a similar diagram to that shown in FIG. 8, wherein a change in the quantity of ambient light is taken into account.

In case of the control method shown in FIG. 9, the upper limit Lu of luminous intensity likewise serves as a criterion for allowing the IGBT 95 to change from conductive to non-conductive state. This control method differs from that of FIG. 8 by the fact that the upper limit Lu can be changed so as to circumvent the undesirable effect of a change in the quantity of ambient light, but is similar thereto in that the IGBT 95 changes from non-conductive to conductive state at a moment which is determined on the basis of the retrace pulse φSG. Consequently, the length of a conducting period is substantially inversely proportional to the brightness of the object.

Figure 10:
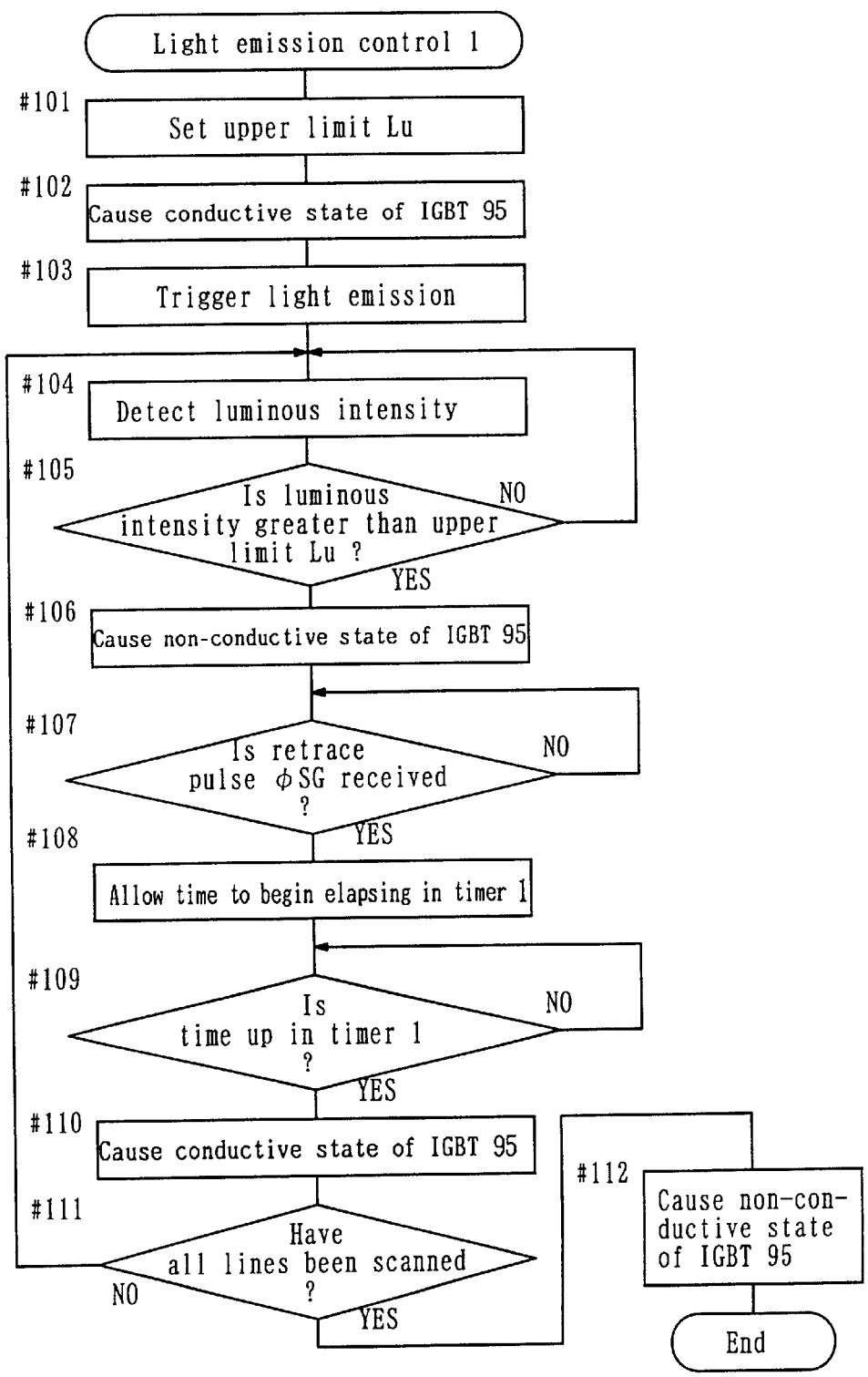
FIG. 10 is a flow diagram representing successive steps in the typical control over light emission effected once for each line.

For a more complete understanding of the successive steps in either of the foregoing two control methods in which light emission is effected once for each line, reference may be had to FIG. 10.

Just before a command to start light emission is received from the CPU 71, information on the quantity DL of light to be emitted by the xenon lamp 91 is provided from the CPU 71 to the controller 191. Upon receipt of the command, an upper limit Lu determined in accordance with the quantity DL is set (step 101). The IGBT 95 changes from non-conducting to conducting state (step 102). The trigger circuit 94 actuates the xenon lamp 91 to strike an arc therein (step 103). The IGBT 95 is changed from conducting to non-conducting state when the output of the photometric circuit 194 indicates that the luminous intensity has come up to the upper limit Lu (steps 104 to 106). In response to a retrace pulse φSG, a time period set in the timer 1 begins to elapse (steps 107 and 108). The IGBT 95 changes from non-conducting to conducting state at the moment when the time which has been set in the timer 1 is up (steps 109 and 110). Steps 104 to 110 are repeated until the prescribed number of lines are scanned (step 111). A command to suspend light emission is provided from the CPU 71 to the controller 191, and the IGBT 95 changes from conducting to non-conducting state so as to provide standby conditions (step 112).

Figure 11:
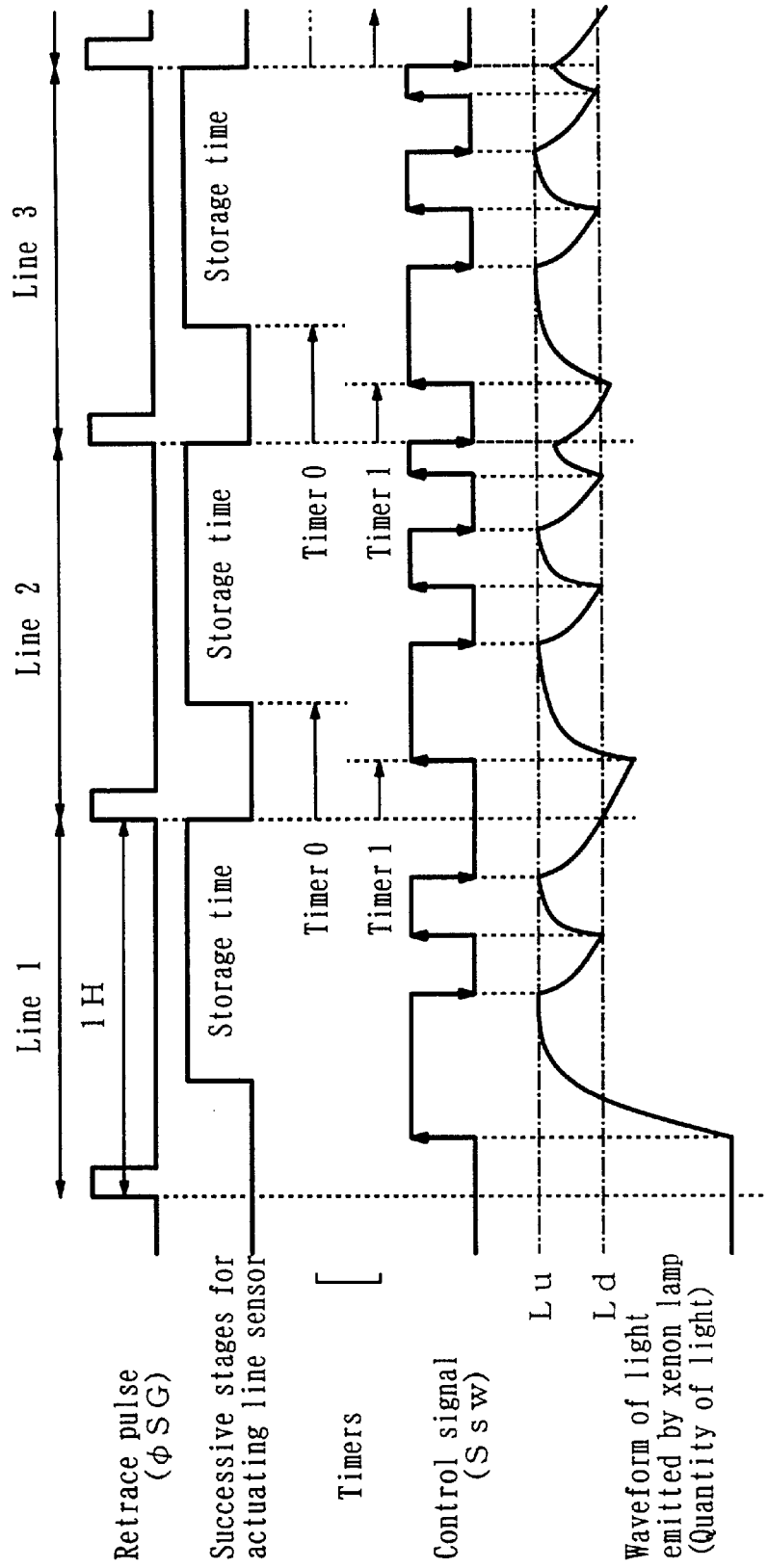
FIG. 11 is a time sequence diagram useful in understanding a manner in which light emission is controlled, wherein light emission is effected plural times for each line and a change in the quantity of ambient light is not taken into account.
Figure 12:
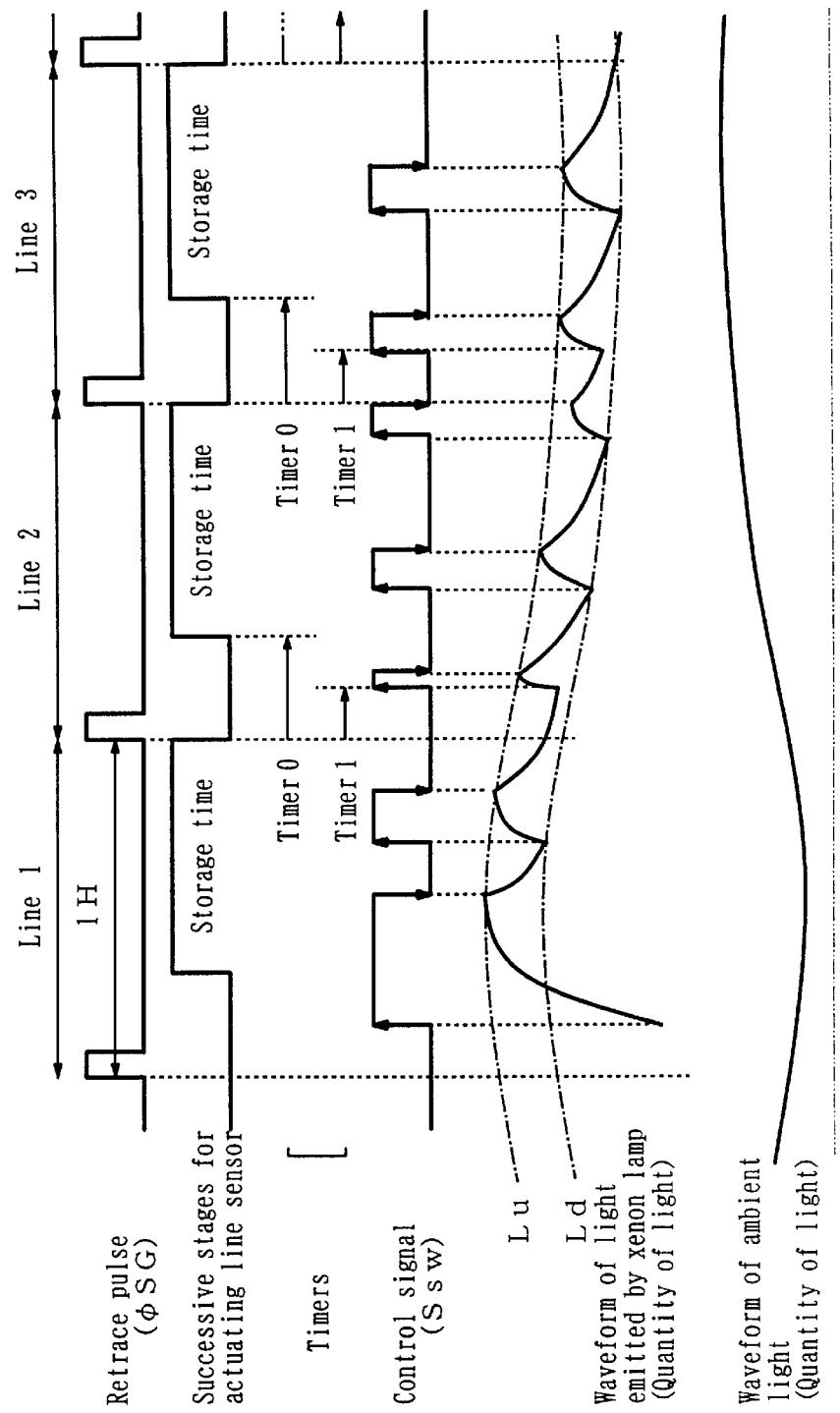
FIG. 12 is a similar diagram to that shown in FIG. 11, wherein a change in the quantity of ambient light is taken into account.

The control methods of FIGS. 11 and 12 differ from those of FIGS. 8 to 10 by the fact that light emission is effected plural times for each line.

During the time when a line is scanned, the initial light emission is commenced in response to a retrace pulse φSG. The IGBT 95 is changed from conducting to non-conducting state when the quantity of light emitted by the xenon lamp 91 comes up to an upper limit Lu. The quantity of light is gradually attenuated. Thus the object is illuminated by the electro-luminescence and afterglow of the xenon lamp 91. The IGBT 95 is changed from non-conducting to conducting state when the luminous intensity of the afterglow comes down to a lower limit Ld. Thereafter, until the shift gate 114 of the line sensor 11 receives another retrace pulse φSG, switching action to which the IGBT 95 is subjected is controlled so as to allow the luminous intensity to fall within a predetermined range. From the second line on, the proper time sequencing of the operation of the IGBT 95 is controlled by a timer 1. In order to obtain suitable luminous intensity during the storage time, the attenuation characteristics of the afterglow of the xenon lamp 91 are taken into account in determining the time to be set in the timer 1. When the line 1 is to be scanned, the retrace pulse φSG may immediately cause the conductive state of the IGBT 95. Alternatively, a third timer may be installed, which allows the IGBT 95 to remain non-conductive for a specified amount of time before allowing the same to automatically change to conductive state. The aforesaid specified amount of time may be determined in accordance with the buildup of light emission. The proper time sequencing of the commencement and termination of light emission to be effected plural times for each line may be controlled by means of another timer which works in synchronism with the retrace pulse train φSG. The control method shown in FIG. 12 differs from that of FIG. 11 by the fact that the upper limit Lu and the lower limit Ld can be changed so as to circumvent the undesirable effect of a change in the quantity of ambient light, but is similar thereto in that the IGBT 95 changes from non-conductive to conductive state at a moment which is determined on the basis of the retrace pulse φSG. Consequently, the length of a conducting period is substantially inversely proportional to the brightness of the object.

Figure 13:
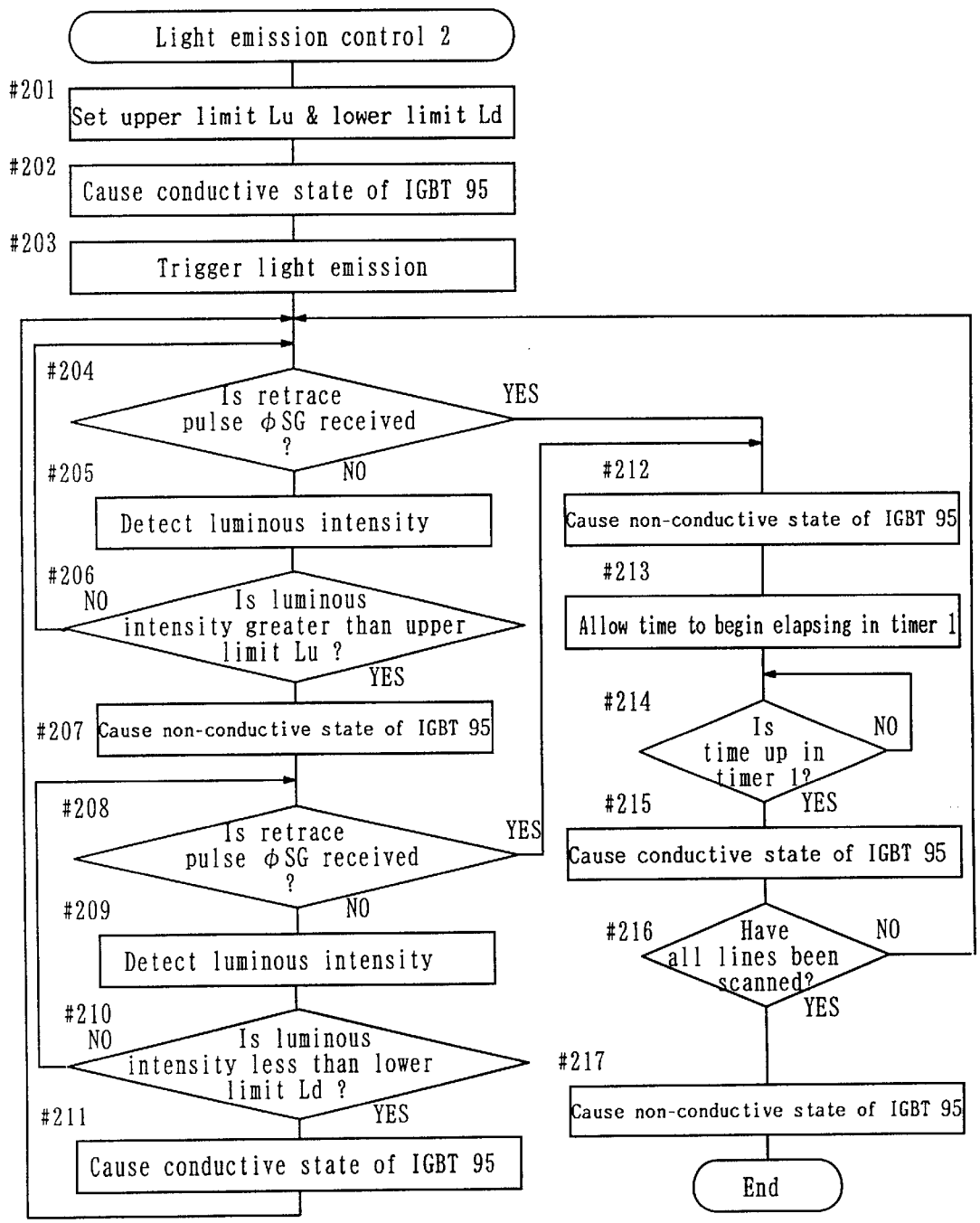
FIG. 13, is a flow diagram representing successive steps in the typical control over light emission effected plural times for each line.

FIG. 13 is a similar flow diagram to that shown in FIG. 10 but showing the case where light emission is effected plural times for each line.

The upper limit Lu and the lower limit Ld are set when a command to start light emission is received from the CPU 71. The xenon lamp 91 is lighted by the IGBT 95 changed from non-conducting to conducting state (steps 201 to 203). Thereafter, the IGBT 95 is repeatedly changed from conducting to non-conducting state and vice versa until the shift gate 114 of the line sensor 11 receives a second retrace pulse φSG after receipt of a first one (steps 204 to 211). Upon receipt of the second retrace pulse φSG, the IGBT 95 is forced to change from conducting to non-conducting state irrespective of the quantity of light which has been emitted by the xenon lamp 91 (step 212). A time period set in the timer 1 begins to elapse (step 213). The IGBT 95 changes from non-conducting to conducting state at the moment when the time which has been set in the timer 1 is up (steps 214 and 215). Thereafter, until the shift gate 114 of the line sensor It receives a third retrace pulse φSG, the IGBT 95 is repeatedly changed from non-conducting to conducting state and vice versa in accordance with the quantity of light emitted by the xenon lamp 91. A command to suspend light emission is provided from the CPU 71 to the controller 191, and the IGBT 95 changes from conducting to non-conducting state so as to provide standby conditions (steps 216 and 217). A suitable timer for allowing the initial light emission to be commenced in the line 1 may be installed. This timer may be similar to the timer 1 described above with reference to the initial light emission to be commenced in the subsequent lines.

Light emission allowed to take place plural times for each line serves to make the luminous intensity uniform throughout the photographing and allow the aperture of the line sensor 11 to approach a most favorable shape.

Figure 14:
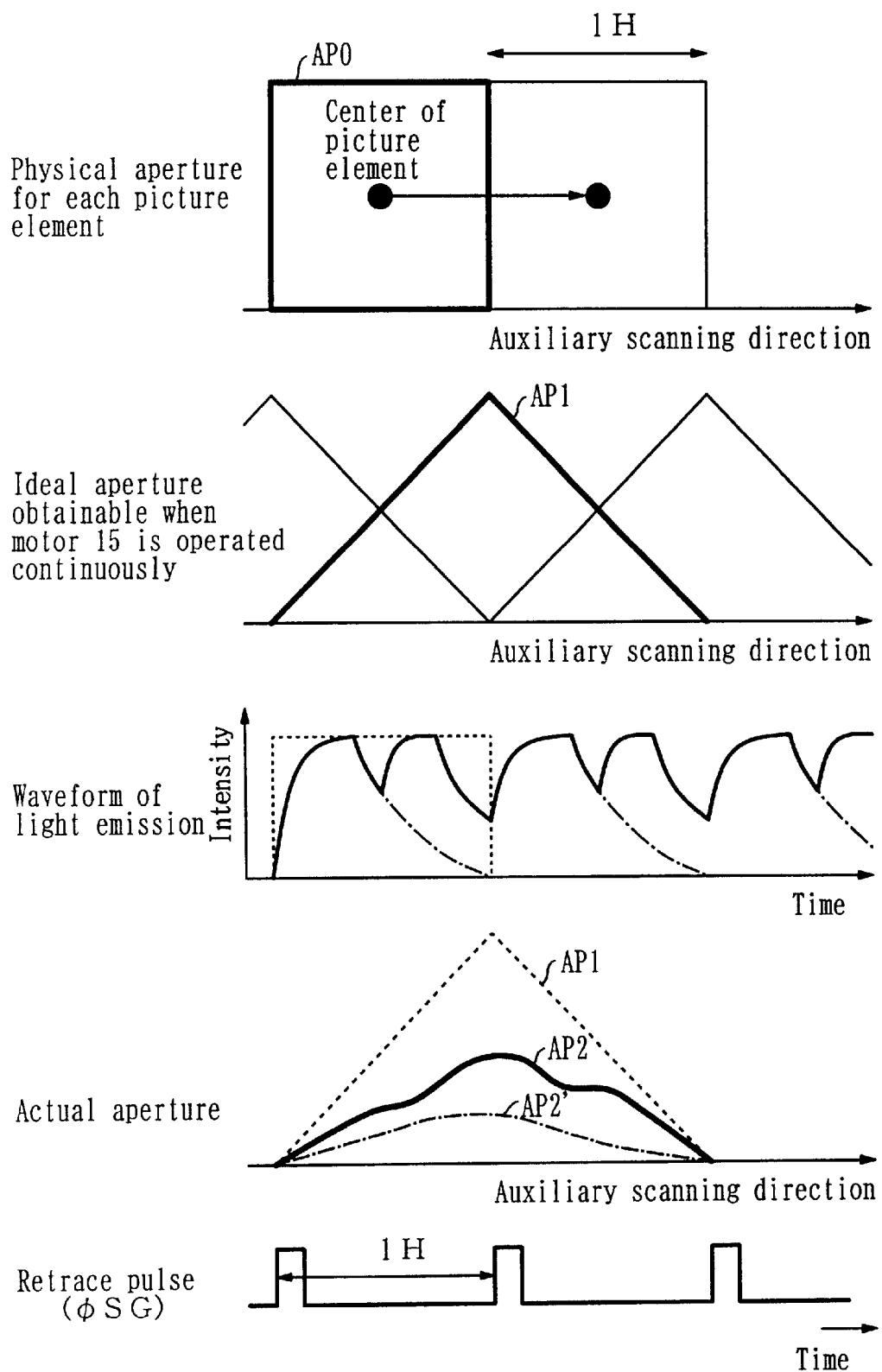
FIG. 14 illustrates the relationship between the waveform of light emission and the shape of the aperture.

Referring now to FIG. 14 which is a diagram representing the shapes of the aperture obtainable according to whether the light emission is allowed to take place once or plural times for each line, the physical aperture AP0 for each picture element provided on the line sensor 11 is substantially square. Assuming that the motor 15 is operated continuously instead of being operated stepwise and that the luminous intensity of the light beam striking the object is constant throughout each period during which a line is scanned, a triangular aperture API is assumed to result from the fact that the positional relationship between the object and the picture element changes with the lapse of time during the aforesaid period. Since the actual luminous intensity is not constant, an actual aperture AP2 has a plurality of crests which are reflective of the waveform of light emission allowed to take place plural times for each line, and even the highest crest of the aperture AP2 is lower than the apex of the aperture AP1. However, the aperture AP2 is closer to the aperture AP1 than an aperture AP2' obtained from light emission allowed to take place once for each line. This means that, as compared with light emission allowed to take place once for each line, light emission allowed to take place plural times for each line has a stronger tendency to providing conditions obtainable when the luminous intensity is constant. Higher resolution and sharpness are obtained thereby. A further significant benefit is a distinct improvement in S/N ratios.

Noise is apt to result from switching action to which the IGBT 95 is subjected, especially when it changes from non-conducting to conducting state. This noise disturbs the readout of photoelectric transfer signals from the line sensor 11 to the extent of making the readout asynchronous with a high-frequency clock Pulse train and deteriorating the picture quality. In order to avoid the disturbing effect on the readout, the invention contemplates subjecting the IGBT 95 to switching action during blanking time, i.e., during the time when the photoelectric transfer signals are not read out of the line sensor 11.

Figure 15:
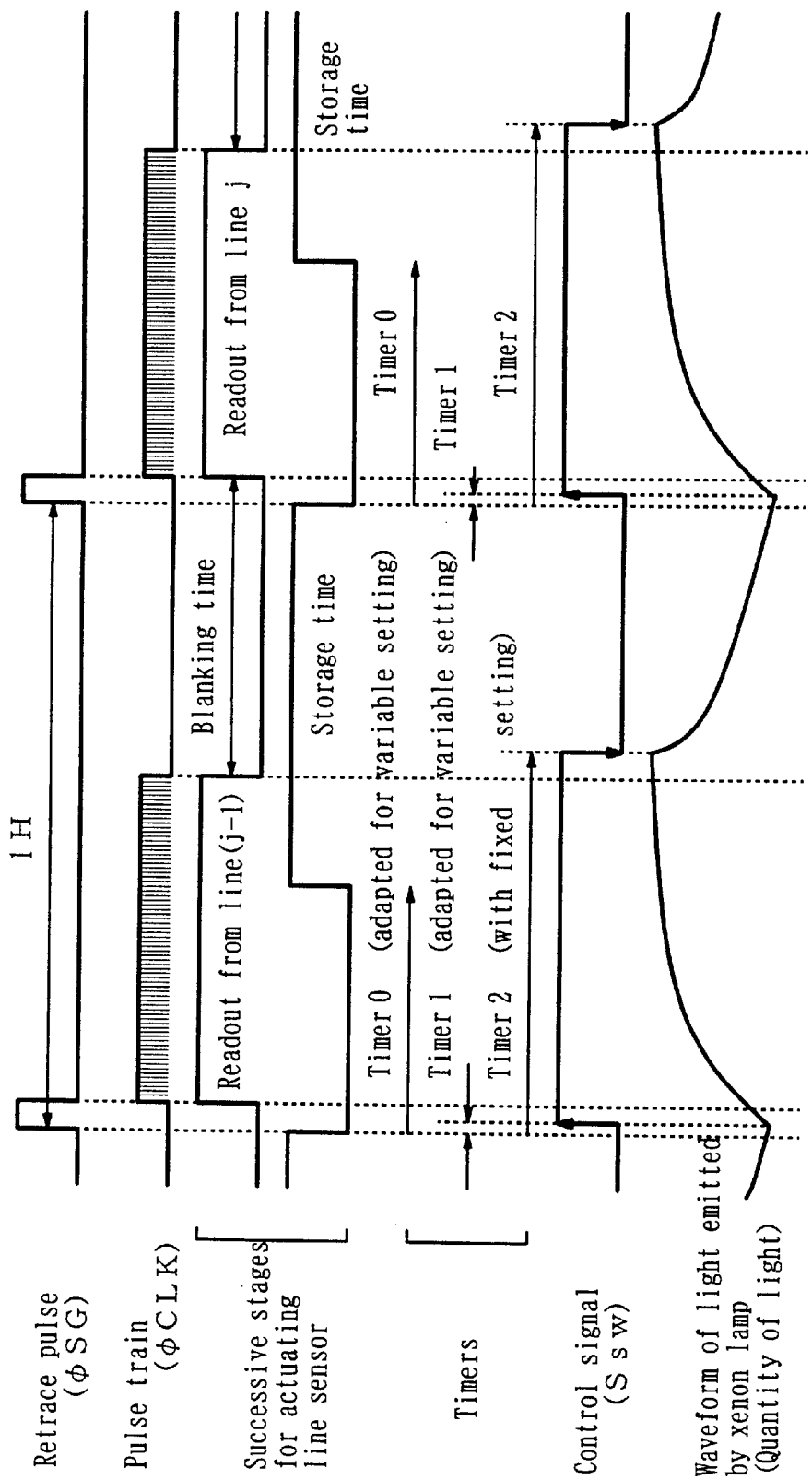
FIG. 15 is a time sequence diagram useful in understanding how the light is turned off and on during blanking time under the condition that storage time is variable.
Figure 16:
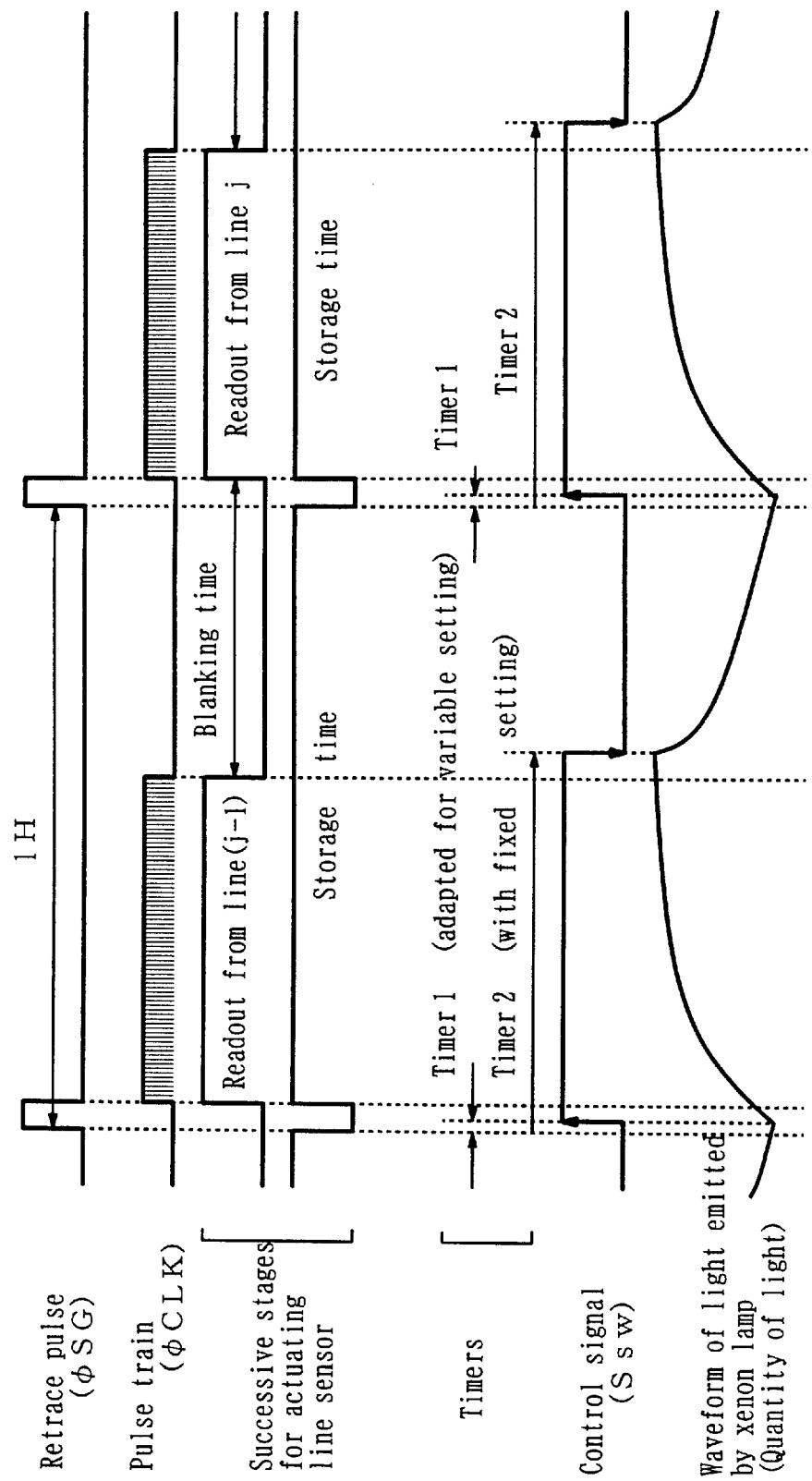
FIG. 16 is a time sequence diagram useful in understanding how the light is turned off and on during blanking time under the condition that storage time is fixed.

Referring in more detail to the manners in which the IGBT 95 is subjected to switching action during blanking time, reference should be made to FIGS. 15 and 16.

FIG. 15 is premised on an assumption that the storage time during which the CCD stores charge is variable. The timer 0 allows the CCD to begin to store charge at the beginning of each storage time. Time to be set in the timer 0 is determined by the conditions of surroundings. By contrast, by the expression "storage time" as used in FIG. 16 is meant a fixed period of time defined by the trailing edge of a retrace pulse φSG and the leading edge of a succeeding retrace pulse φSG. In either case, the readout of photoelectric transfer signals from the line sensor 11 is commenced at the moment when the trailing edge of a retrace pulse φSG is encountered, and is terminated before the leading edge of a succeeding retrace pulse φSG is encountered. The timer 1 is set to provide a certain time period, at the end of which the light emission is commenced in each line. The time which has been set in the timer 1 is up in the time interval between the leading edge and the trailing edge of an identical retrace pulse φSG. A timer 2 is set to provide another time period, at the end of which the light emission is terminated in each line. The time which has been set in the timer 2 is up immediately after the termination of the readout of photoelectric transfer signals from the line sensor 11. This means that the IGBT 95 changes from non-conducting to conducting state before the commencement of readout and changes conversely after the termination thereof, i.e., the IGBT 95 is subjected to switching action during blanking time.

Figure 17:
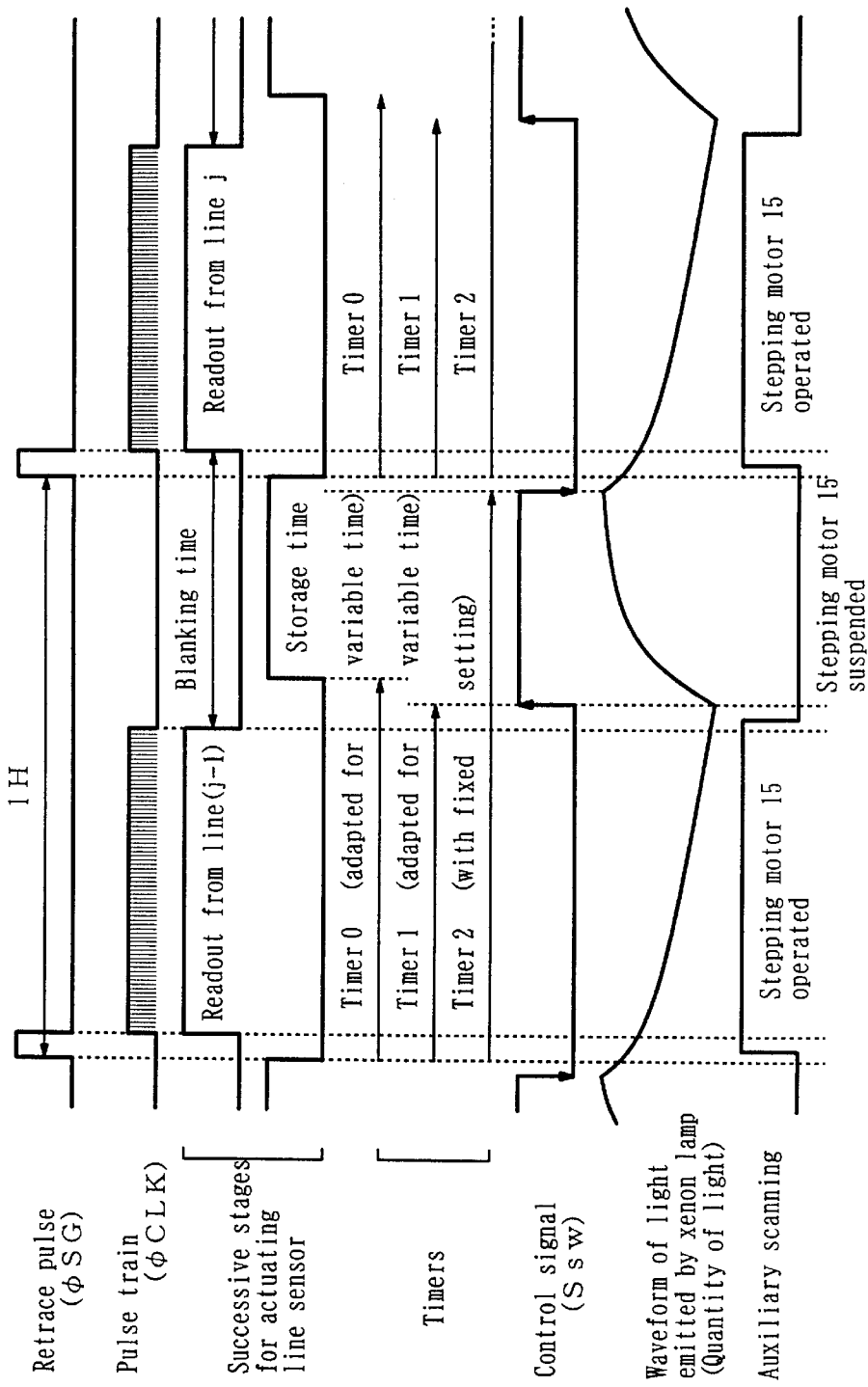
FIG. 17 is a time sequence diagram useful in understanding the case where an auxiliary scanning mechanism is driven stepwise and the light is on substantially throughout the storage time.
Figure 18:
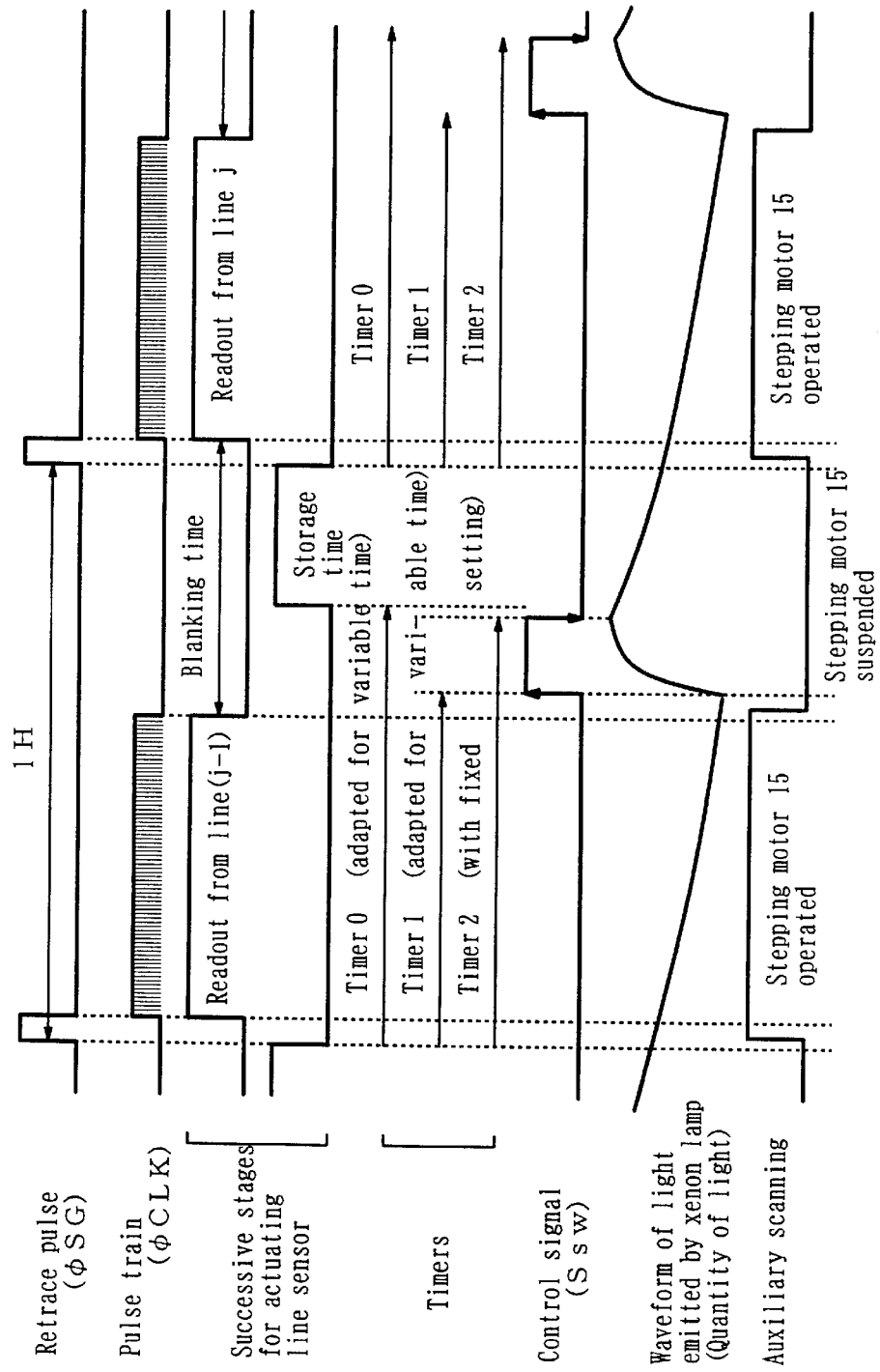
FIG. 18 is a time sequence diagram useful in understanding the case where an auxiliary scanning mechanism is driven stepwise and the light is turned off before the commencement of storage time.

FIGS. 17 and 18 are similar diagrams to those shown in FIGS. 15 and 16 but showing the case where the motor 15 is operated stepwise.

A stepping motor is used as the motor 15. The mirror 14 receives its intermittent drive from the motor 15 and rotates through a predetermined angle every time the shift gate 114 of the line sensor 11 receives a retrace pulse φSG. In parallel therewith, photoelectric transfer signals are read out of the line sensor 11. The CCD stores charge during the time when the mirror 14 is at a standstill. In order to avoid the aforesaid disturbing effect on the readout, the IGBT 95 is changed from non-conducting to conducting state during the time when the mirror 14 is at a standstill in course of blanking time.

The storage time for the CCD begins at the moment when the time which has been set in the timer 0 is up and ends at the moment when the leading edge of a succeeding retrace pulse φSG is encountered. The timer 1 allows the light emission to be commenced, and the timer 2 allows it to be terminated. Time periods set in the timers 0, 1 and 2 begin to elapse at the moment when the leading edge of a retrace pulse φSG is encountered.

In case of the control method shown in FIG. 17, the time which has been set in the timer 1 is up after the readout of photoelectric transfer signals from the line sensor 11 and before the time which has been set in the timer 0 is up. Consequently, light emission is commenced before the storage time for the CCD begins. The time which has been set in the timer 2 is up just before the leading edge of a succeeding retrace pulse φSG is encountered. Consequently, light emission is terminated just before the storage time for the CCD ends.

It is contemplated in case of the control method shown in FIG. 18 that, when a large quantity of light has to be emitted by the xenon lamp 91, the timer 1 is set to provide a short time period so as to advance the commencement of light emission and, when a small quantity of light suffices, the timer 1 is set to provide a long time period so as to introduce a time delay in commencing the light emission. The time which has been set in the timer 2 is up before the time which has been set in the timer 0 is up. Consequently, light emission is commenced before the storage time for the CCD begins, and the object is illuminated only by the gradually attenuating afterglow during photographing.

Whether the control method shown in FIG. 17 or that shown in FIG. 18 should be used depends on the waveform characteristics of afterglow, quantity of light to be emitted by the xenon lamp 91, and the length of storage time. For example, the control method shown in FIG. 18 is suited to the case where longer storage time is required. This is because, in such a case, the control method shown in FIG. 17 will result in allowing the xenon lamp 91 to emit more light than actually required.

Figure 19:
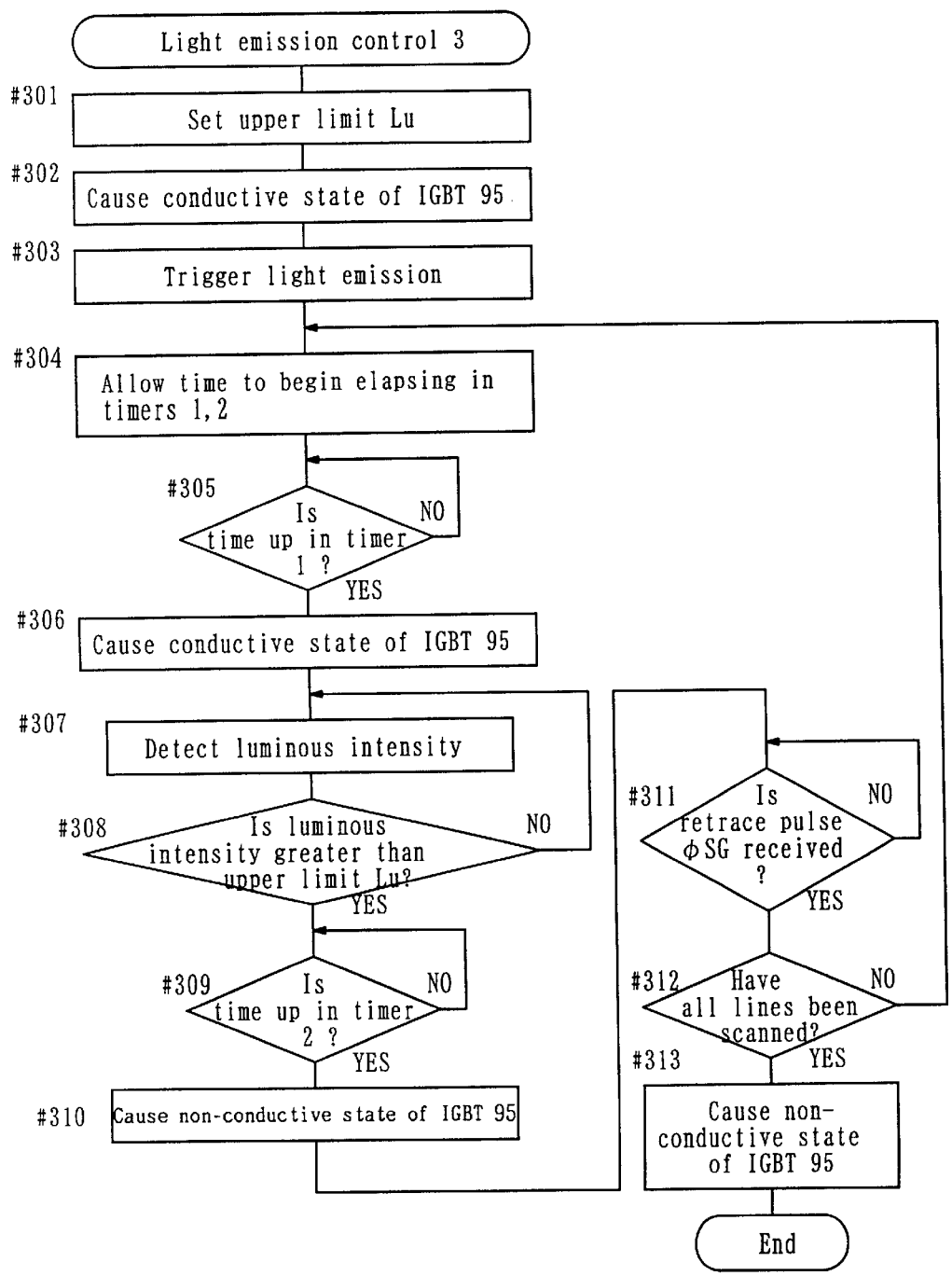
FIG. 19 is a flow diagram representing successive steps in the typical control over light emission, the control being carried into effect such that the light source is subjected to switching action during retrace time.

For a more complete understanding of the successive steps in any of the foregoing three control methods shown in FIGS. 15 to 17, reference may be had to FIG. 19.

At the request from the CPU 71 for light emission, the quantity of light to be emitted by the xenon lamp 91 is set (step 301). The IGBT 95 changes from non-conducting to conducting state (step 302). The trigger circuit 94 actuates the xenon lamp 91 to strike an arc therein (step 303). Light emission is commenced by the timer 1 and terminated when the luminous intensity comes up to an upper limit and when the time which has been set in the timer 2 is up. This control sequence is repeated in synchronism with the retrace pulse train φSG (steps 304 to 311). When a command to suspend light emission is provided from the CPU 71 to the controller 191, the IGBT 95 changes from conducting to non-conducting state so as to provide standby conditions (steps 312 and 313).

Figure 20:
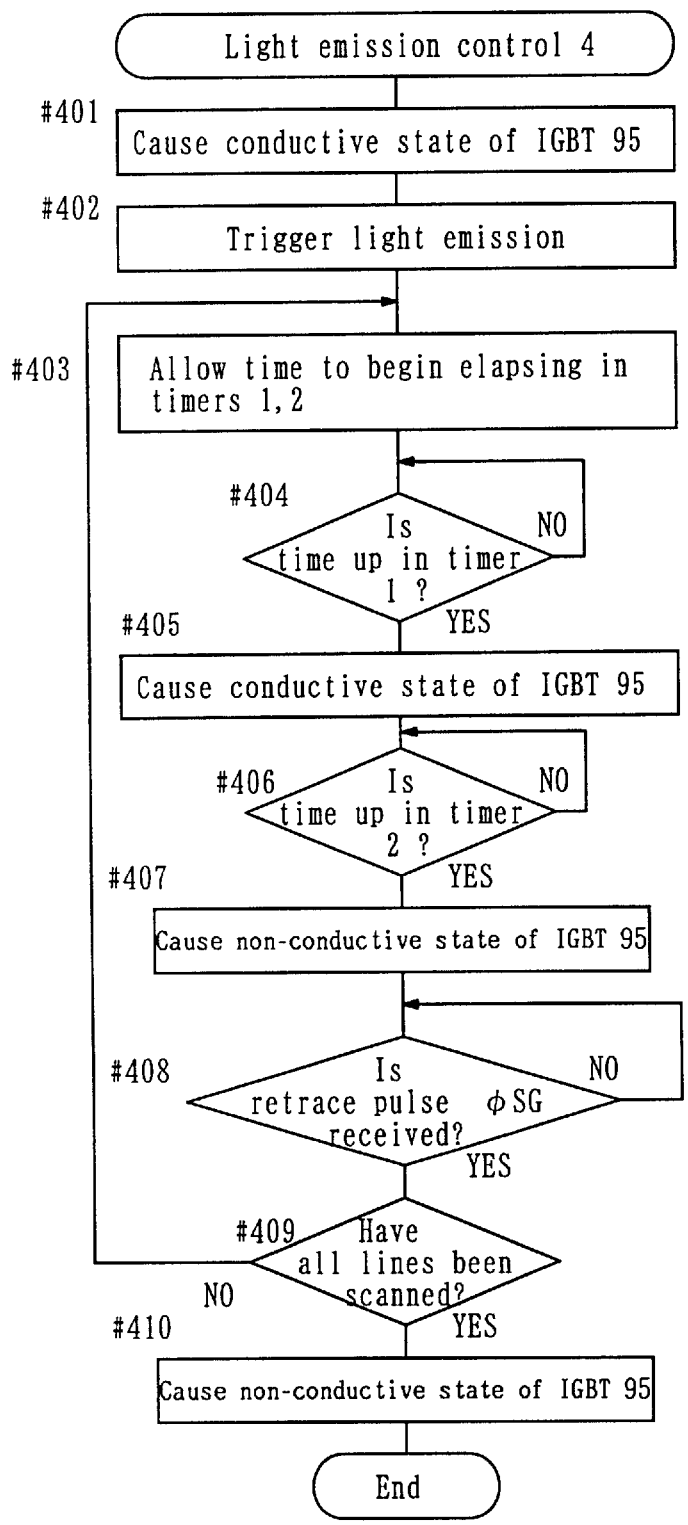
FIG. 20 is a similar flow diagram to that shown in FIG. 19.

FIG. 20 is a similar flow diagram to that shown in FIG. 19 but showing the successive steps in the control method shown in FIG. 18. The flow diagram shown in FIG. 20 differs from that shown in FIG. 19 by the fact that the steps 301, 307 and 308 are skipped.

Figure 21:
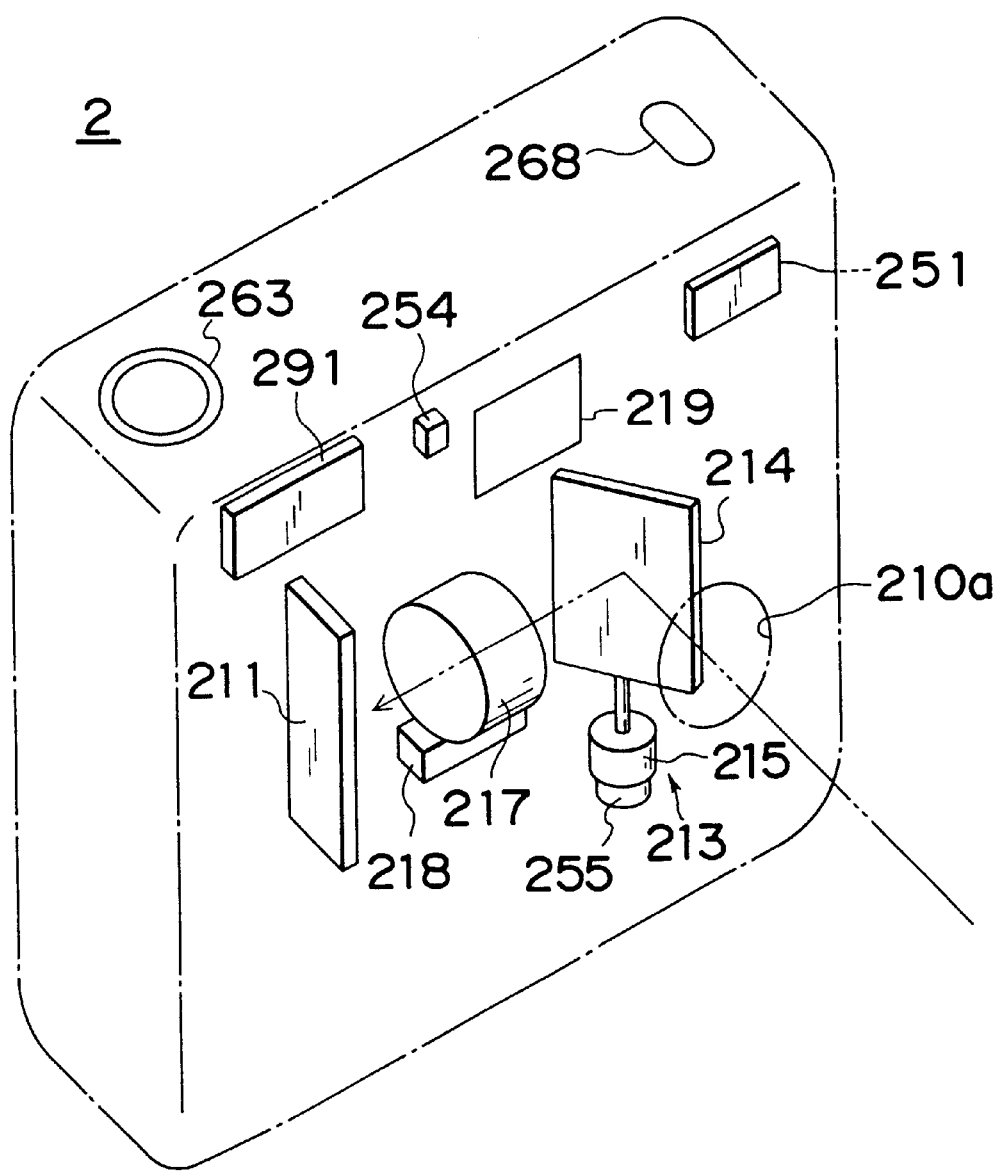
FIG. 21 is a view showing the component parts of a second preferred embodiment of the inventive digital camera.

Referring now to FIG. 21, another digital camera 2 is shown having substantially the same component parts as the previously described digital camera 1. Incident light from an object strikes a mirror 214 disposed inwardly of a window 210a. Then the incident light is reflected to an image-forming lens assembly 217 and directed to a line sensor 211. The mirror 214 and a motor 215 constitute an auxiliary scanning mechanism 213. The angular position of a shaft from the motor 215, by which the mirror 214 is carried, is detected by a sensor 255 which may be a rotary encoder. The digital camera 2 is similar to the digital camera 1 described above with reference to FIG. 1 in so far as the former is also provided with an actuator 218 for electrically-driven zooming, optical view finder 219, photometric sensor 251, range-finding sensor 254, light source 291 for illumination, release button 263 and mode switch 268.

Figure 22:
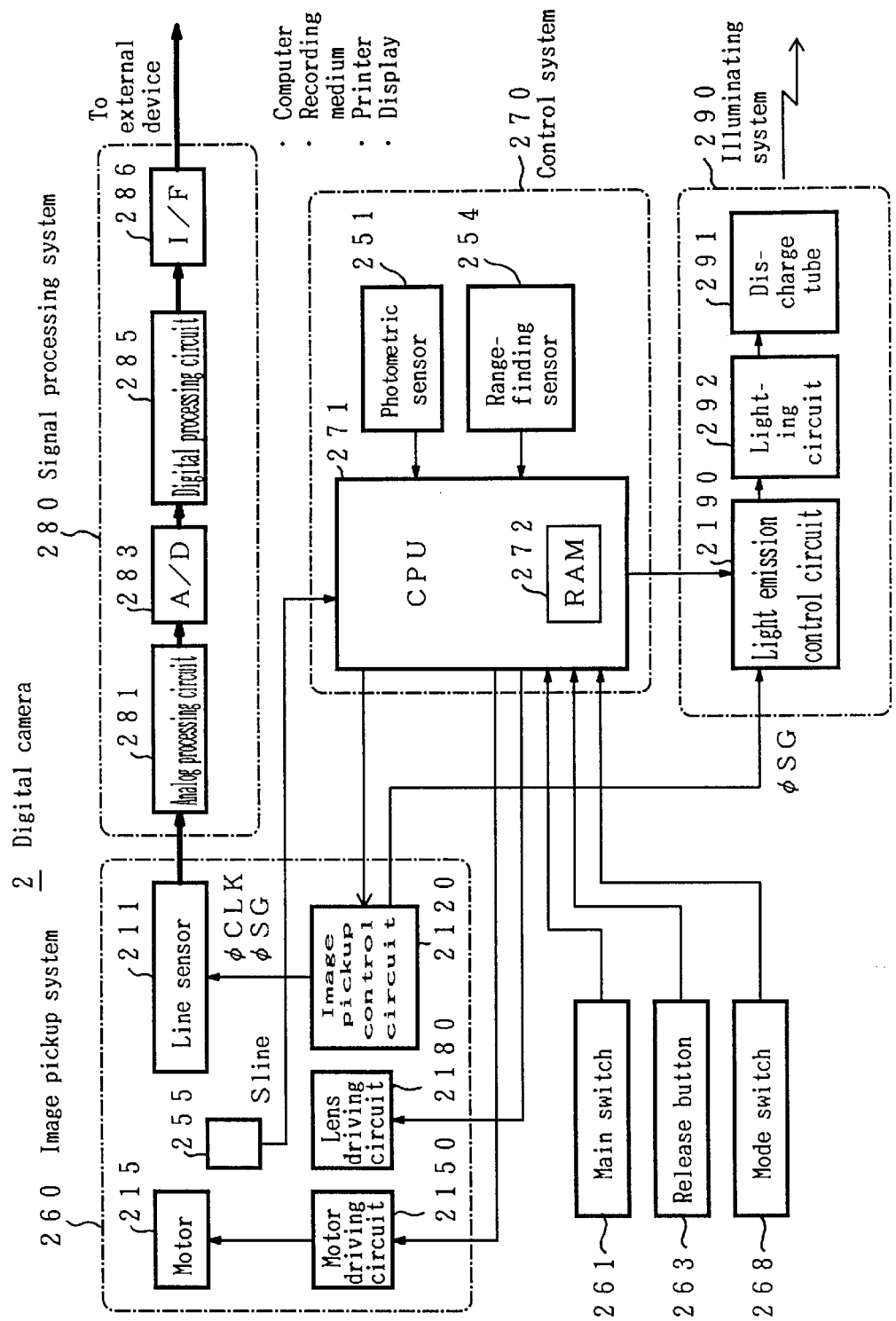
FIG. 22 is a block diagrammatic representation thereof.

Referring now to FIG. 22, an image pickup system 260 for scanning the object in order of successive lines comprises the line sensor 211, motor 215, sensor 255, motor driving circuit 2150, lens driving circuit 2180 and image pickup control circuit 2120. A signal processing system 280 comprises an analog processing circuit 281, A/D converter 283, digital processing circuit 285 and interface 286. An illuminating system 290 comprises a xenon lamp 291, lighting circuit 292 and light emission control circuit 2190. Information on the quantity of light to be emitted by the xenon lamp 291 is provided from a CPU 271 to the light emission control circuit 2190. The CPU 271 forms a principal part of a control system 270.

It will be understood that the control over the scan operation in order of successive lines and the on-off control over the illumination can be effected at least in two different manners as follows: In the digital camera 1, they are effected by the retrace pulse φSG generated by the image pickup control circuit 120. In the digital camera 2, they are effected by the CPU 271 and the light emission control circuit 2190 on the basis of a signal $S_{line}$ outputted from the sensor 255.

It is well known that, when the scan operation in order of successive lines is carried out with a fixed period, an image is distorted by irregular speed of displacement or revolution which occurs in the moving or revolving Part of an auxiliary scanning mechanism. This is particularly critical where a digital camera has means for rotating a mirror because, in order to obtain constant scanning speed on the surface of the object, the mirror has to be rotated at higher speed during scanning near the ends of each line. Irregular speed of revolution is apt to be caused also by long response time of such means to a change in control signal. The distortion of the image will be minimized if the scan operation for a line is commenced at the moment when the mirror 214 is angularly properly offset with respect to the line sensor 211. An excellent photograph in which all lines have equal brightness will be obtained if the illumination is switched on and off synchronously with the aforesaid scan operation.

Figure 23:
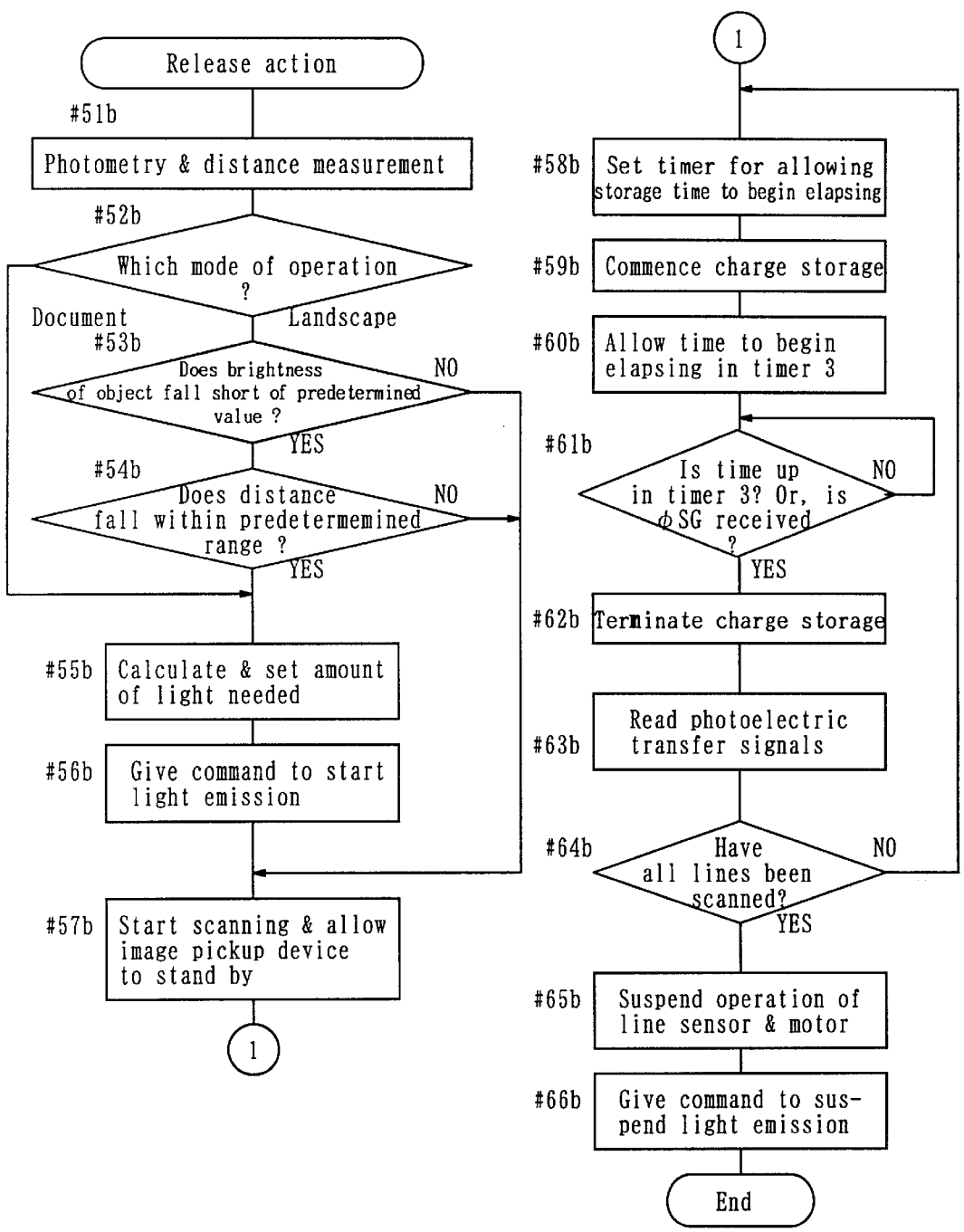
FIG. 23 is a flow diagram representing successive steps in release action carried out by the CPU.

FIG. 23 is a similar flow diagram to that shown in FIG. 5 but is reflective of the difference between the release action effected by the CPU 71 and that effected by the CPU 271.

Steps 51b to 59b are the same as steps 51 to 59 described above with reference to FIG. 5. To provide for uniform integration time irrespective as to whether or not irregular speed of revolution occurs in the mirror 214, provision is made in this embodiment of an additional step in the form of step 60b, in which a time period set in a timer 3 (FIG. 24) begins to elapse. Integration in the CCD comes to an end either at the moment when the time which has been set in the timer 3 is up or at the moment when the retrace time is commenced (i.e., when the leading edge of a retrace pulse φSG is encountered), whichever moment may offer itself earlier (step 61b). Steps 62b to 66b are the same as steps 61 to 65 described above with reference to FIG. 5.

Figure 24:
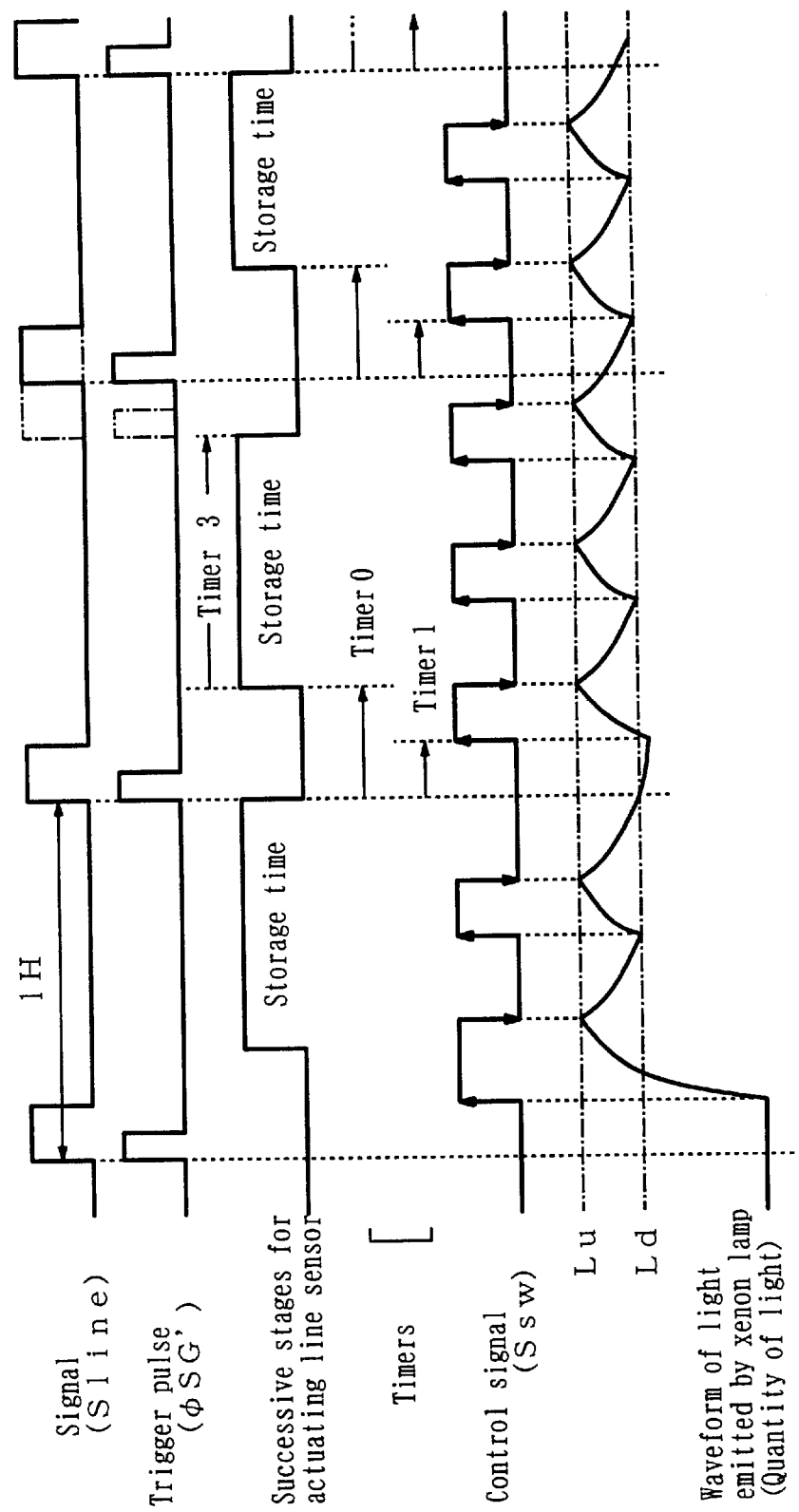
FIG. 24 is a time sequence diagram useful in understanding a manner in which light emission is controlled on the basis of the detected angular position of a revolving part of the auxiliary scanning mechanism.

Referring in more detail to the manner in which the scan operation for each line is commenced at the moment when the mirror 214 is angularly properly offset with respect to the line sensor 211, reference should be made to FIG. 24.

Every time the mirror 214 rotates through a predetermined angle, the aforesaid signal $S_{line}$ indicating the angular position of the mirror 214 is outputted from the sensor 255. In synchronism with the signal $S_{line}$, a trigger pulse φSG' is generated to trigger the readout of photoelectric transfer signals from the line sensor 211. The illuminating system 290 is also controlled by the trigger pulse φSG'.

In response to the trigger pulse φSG', the IGBT changes from non-conducting to conducting state and light emission is commenced. The IGBT is changed from conducting to non-conducting state when the quantity of light emitted by the xenon lamp 291 comes up to an upper limit Lu. The IGBT is changed conversely when the luminous intensity of the afterglow comes down to a lower limit Ld. From the second line on, the proper time sequencing of the operation of the IGBT is controlled by a timer 1. In order to obtain suitable luminous intensity during the storage time, the attenuation characteristics of the afterglow of the xenon lamp 291 are taken into account in determining the time to be set in the timer 1. When the line 1 is to be scanned, the trigger pulse φSG' may immediately cause the conductive state of the IGBT. Alternatively, a third timer may be installed, which allows the IGBT to remain non-conductive for a specified amount of time before allowing the same to automatically change to conductive state. The aforesaid specified amount of time may be determined in accordance with the buildup of light emission.

This embodiment is premised on an assumption that the illuminating system 290 includes a controller, which is similar to the controller 191 described above with reference to FIG. 3. When light emission is to be effected once for each line, the action of the controller in the illuminating system 290 in controlling the light emission is identical with the action hereinabove described with reference to FIG. 10. When light emission is to be effected plural times for each line, the action is identical with that described above with reference to FIG. 13. In either case, the pulse train with which the illumination is switched on and off synchronously is not the retrace pulse train φSG as is the case with FIGS. 10 and 13 but the trigger pulse train φSG'.

Figure 25:
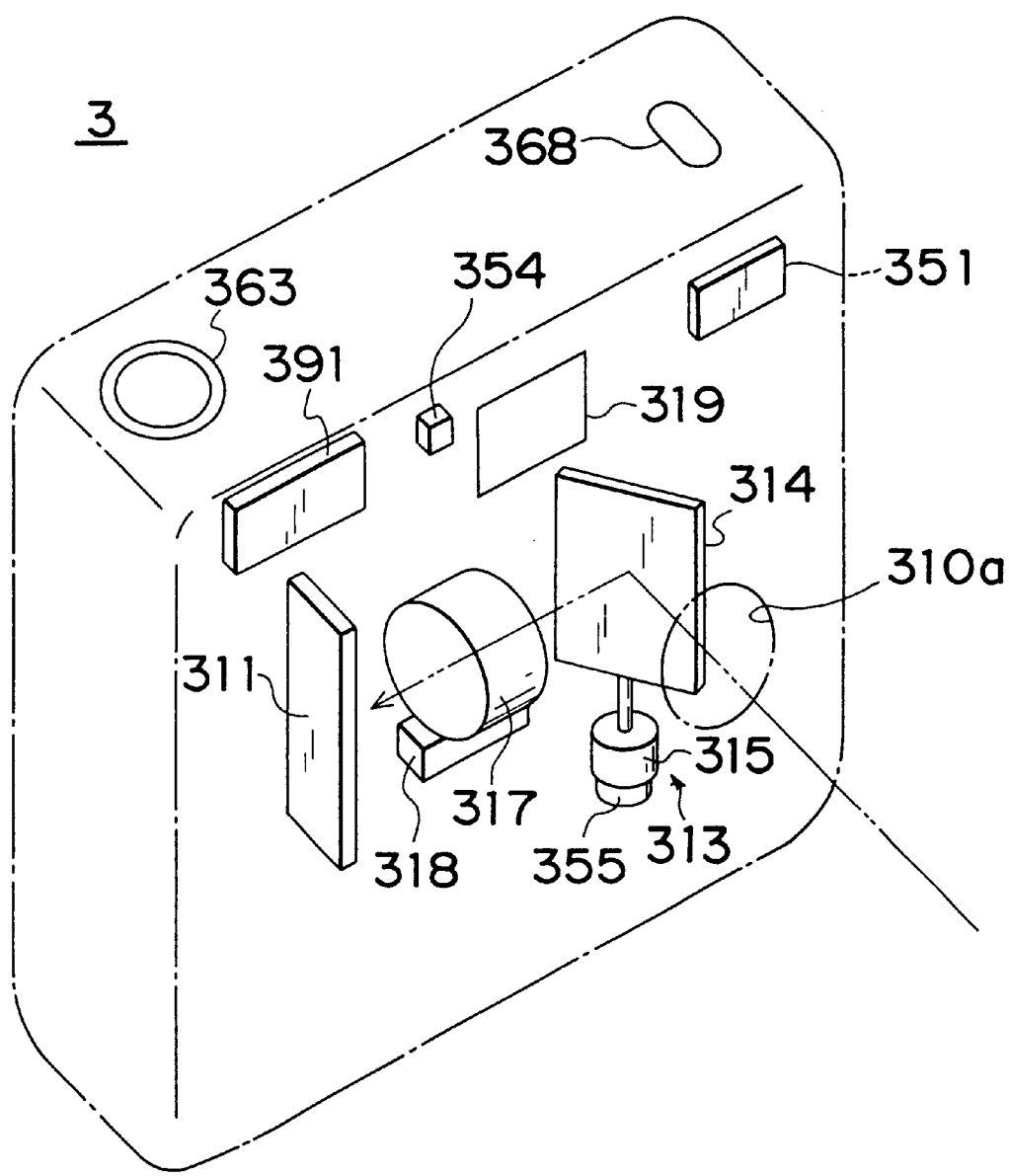
FIG. 25 is a view showing the component parts of a third preferred embodiment of the inventive digital camera.

Referring now to FIG. 25, still another digital camera 3 is shown having substantially the same component parts as the previously described digital camera 1. Incident light from an object strikes a mirror 314 disposed inwardly of a window 310a. Then the incident light is reflected to an image-forming lens assembly 317 and directed to a line sensor 311. The mirror 314 and a motor 315 constitute an auxiliary scanning mechanism 313. The angular position of a shaft from the motor 315, by which the mirror 314 is carried, is detected by a sensor 355. The digital camera 3 is similar to the digital camera 1 described above with reference to FIG. 1 in so far as the former is also provided with an actuator 318 for electrically-driven zooming, optical view finder 319, photometric sensor 351, range-finding sensor 354, light source 391 for illumination, release button 363 and mode switch 368.

Figure 26:
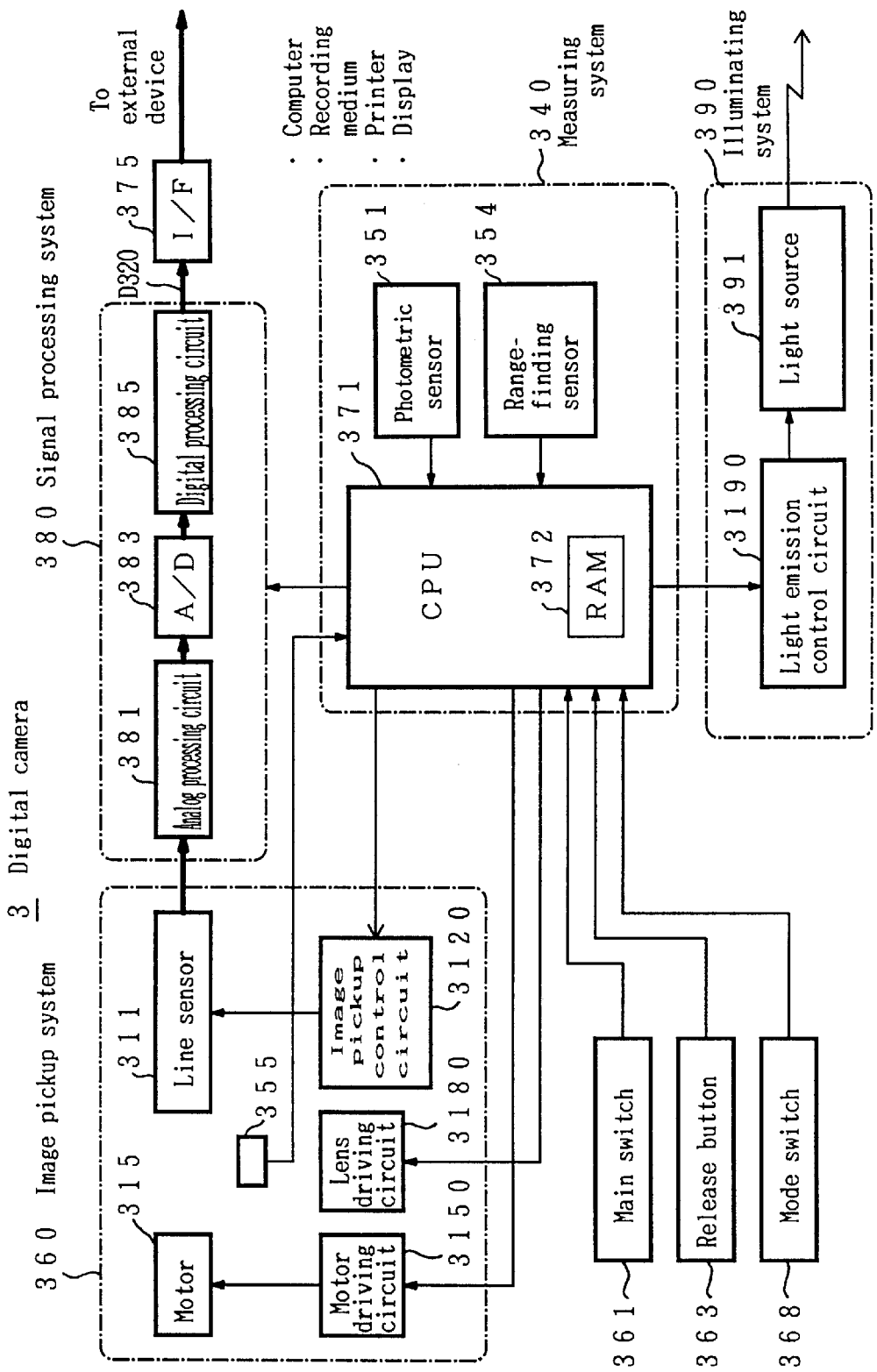
FIG. 26 is a block diagrammatic representation thereof.

Referring now to FIG. 26, the digital camera 3 comprises a measuring system 340 for measuring the conditions of surroundings from time to time, an image pickup system 360 for converting an image into picture signals, and a signal processing system 380 for outputting a prescribed form of data, and an illuminating system 390 for optimizing the brightness of the object. The measuring system 340 comprises the photometric sensor 351, the range-finding sensor 354, and a CPU 371 for controlling the whole of the digital camera 3. The image pickup system 360 comprises the line sensor 311, motor 315, sensor 355, motor driving circuit 3150, lens driving circuit 3180 and image pickup control circuit 3120. The signal processing system 380 comprises an analog processing circuit 381, A/D converter 383 and digital processing circuit 385. Data D320 on photographing are outputted from the signal processing system 380 and fed, through an interface 375, to an external device or a built-in storage medium.

In accordance with a program, the CPU 371 carries out data processing in response to a signal received from any sensor or in response to a manually applied force on a main switch 361 or any other switch. For example, on the basis of an output signal developed by the sensor 355, the CPU 371 detects the angle and speed of rotation of the shaft from the motor 315. Then a command is provided from the CPU 371 to the motor driving circuit 3150 so that the object may be scanned at prescribed speed. A RAM 372 is provided as a work area for the aforesaid program to be executed by the CPU 371.

The image pickup control circuit 3120 begins to effect control over the line sensor 311 in response to a starting signal taken from the CPU 371 and outputs a signal to the line sensor 311 so as to prescribe the timing of integrating the charge storage. The line sensor 311 latches a photoelectric transfer signal for each picture element in response to a signal indicating the termination of integration and outputs the photoelectric transfer signals to the signal processing system 380 in order of picture elements arranged on the line sensor 311. The main scanning is carried out repeatedly in this manner with a period of line feed (i.e. with a period of $\Delta T$).

Prior to photographing, except where the object need not be illuminated, the quantity of light suited for the selected mode of operation is determined on the basis of the outputs of the photometric sensor 351 and the range-finding sensor 354 and is provided from the CPU 371 to a light emission control circuit 3190, which controls a light emission unit 391 so as to allow it to maintain the quantity of light at the determined level throughout the photographing.

Figure 27:
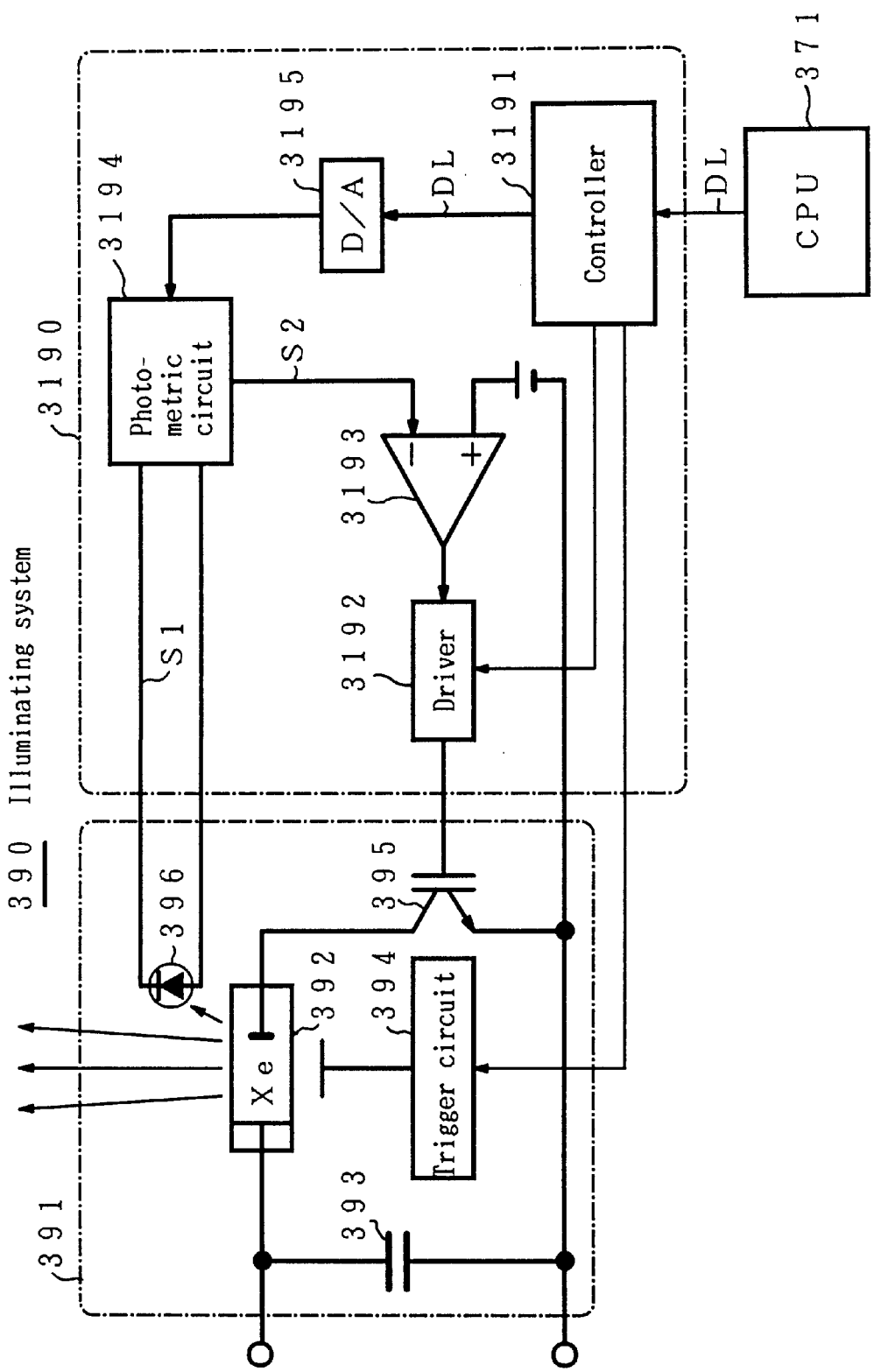
FIG. 27 is a diagrammatic view of the electrical circuit for an illuminating system incorporated therein.

Referring now to FIG. 27, the light emission unit 391 comprises a xenon lamp 392 for illumination, a capacitor 393 in which the necessary electrical energy for causing arc discharge in the xenon lamp 392 is stored, a trigger circuit 394 for actuating the xenon lamp 392 to strike an arc therein, an IGBT 395 arranged to interrupt the circuit to the xenon lamp 392, and a photosensor 396 for monitoring the quantity of light emitted by the xenon lamp 392. The light emission control circuit 3190 comprises a controller 3191, switching driver 3192, comparator 3193, photometric circuit 3194 and digital-to-analog (D/A) converter 3195.

Figure 28:
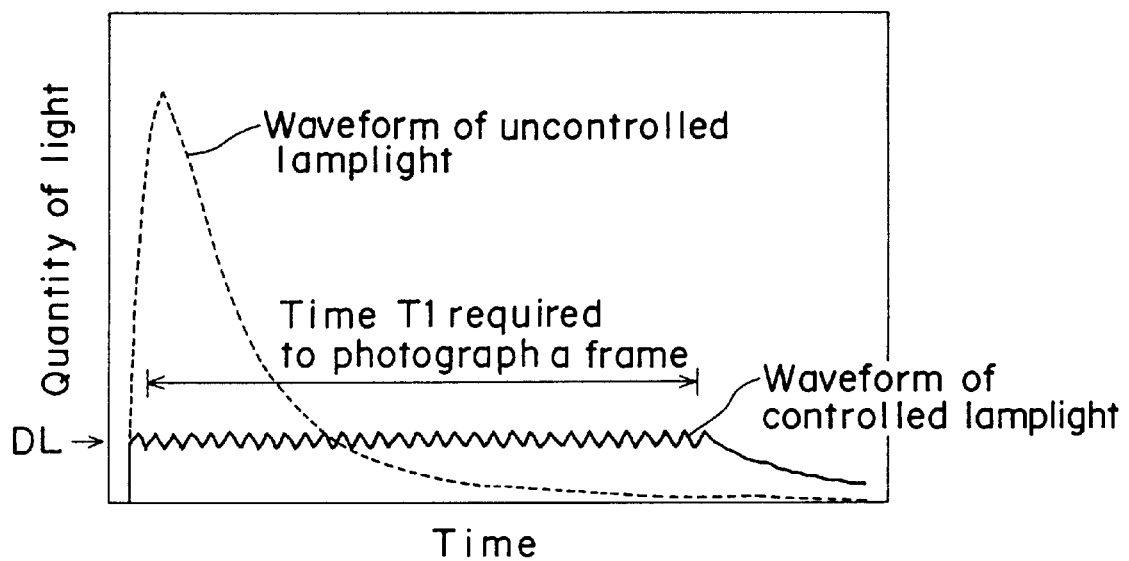
FIG. 28 is a waveform chart, illustrating the waveforms of signals developed in course of an example of control over light emission.

Information on the quantity DL of light to be emitted by the xenon lamp 392 is provided from the CPU 371 to the controller 3191, transferred therefrom to the D/A converter 3195, and transmitted to the photometric circuit 3194 in the form of an analog signal. When a command to start light emission is provided from the CPU 371, the controller 3191 transmits the command to the switching driver 3192 and the trigger circuit 394. The switching driver 3192 causes the conductive state of the IGBT 395. Then the trigger circuit 394 actuates the xenon lamp 392 to strike an arc therein. A portion of light emitted thereby is incident on the photosensor 396, which transmits a signal S1 to the photometric circuit 3194. The signal S1 has a signal level proportional to the quantity of light detected by the photosensor 396. When the quantity of light comes up to the set value DL, the photometric circuit 3194 transmits a predetermined signal voltage S2 to the comparator 3193. A change in the output state of the comparator 3193 takes place, and the switching driver 3192 allows the IGBT 395 to change from conducting to non-conducting state. The photometric circuit 3194 terminates transmission of the signal voltage S2 when the quantity of light becomes smaller than the set value DL. A change in the output state of the comparator 3193 takes place again, and the switching driver 3192 allows the IGBT 395 to change from non-conducting to conducting state. On-off control over the illumination is repeated in this manner until a command to suspend light emission is given to the controller 3191. FIG. 28 illustrates typical results obtained from such on-off control effected over a length of time Ti required to photograph a frame. It will be understood that the quantity of light actually emitted by the xenon lamp 392 remains substantially constant as shown by the rugged line having the set value DL at the center of dispersion.

Figure 29:
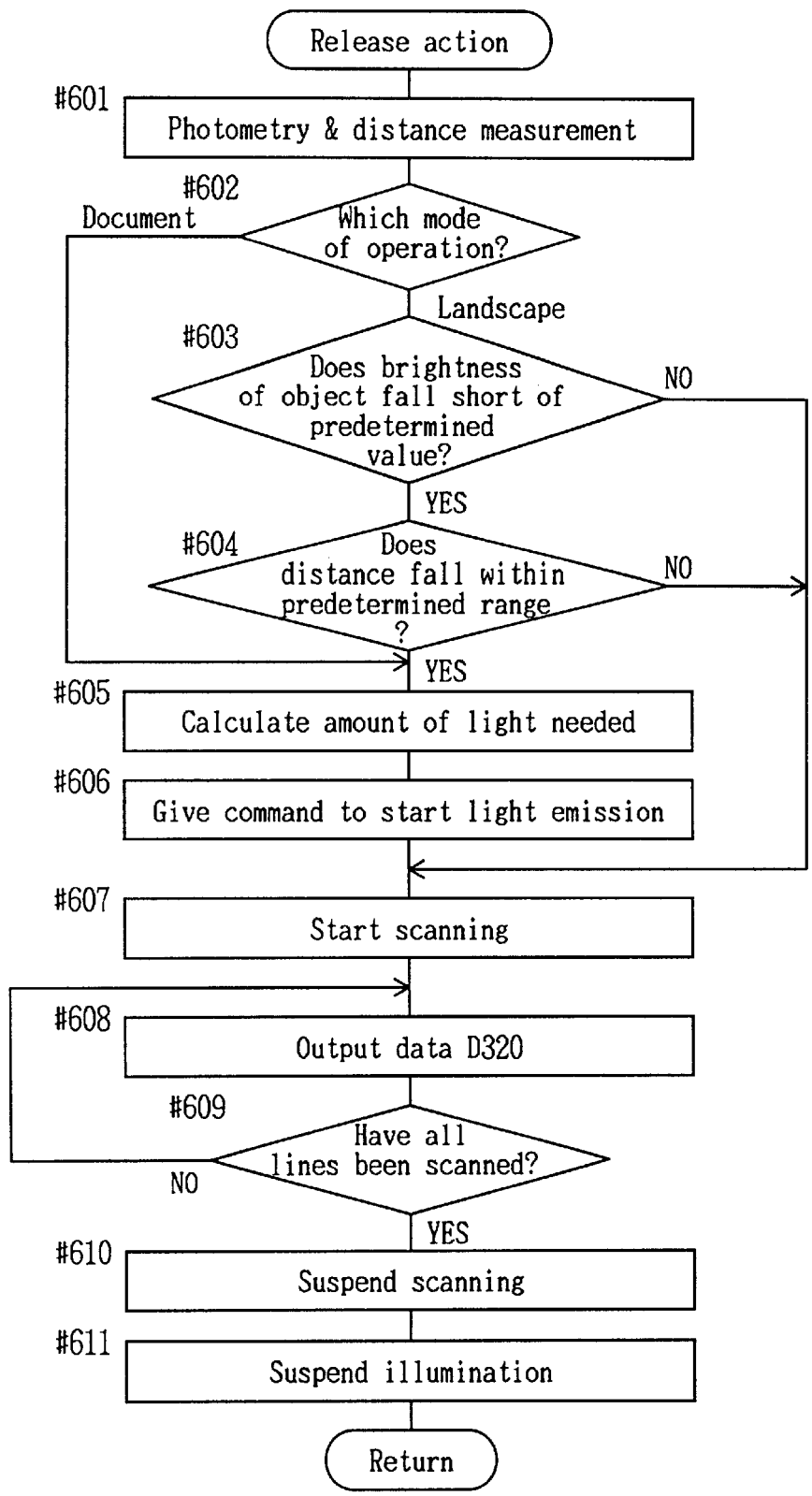
FIG. 29 is a flow diagram representing successive steps in release action carried out in the third embodiment.

For a more complete understanding of the successive steps in release action to be effected in the digital camera 3, reference may be had to FIG. 29.

An output is fetched from the photometric sensor 351 for measuring the brightness of the object before an arc is struck in the xenon lamp 392. In order to measure the camera-to-object distance, an output is fetched from the range-finding sensor 354 (step 601). The mode of operation is checked (step 602). When the document mode is selected, the processing proceeds to step 605 with steps 603 and 604 skipped. This is because the document mode is invariably attended by illumination. In accordance with the results of photometry and distance measurement, and with a view to allowing neither over- nor underexposure to occur, the quantity DL of light to be emitted by the xenon lamp 392 is calculated. When the landscape mode is selected, the aforesaid quantity DL is likewise calculated if the brightness of the object falls short of a predetermined value and if the camera-to-object distance falls within a predetermined range, i.e., if photographic conditions require illumination (steps 603 to 605). A command to start light emission is given to the controller 3191 when the calculated quantity DL to be used as a set value has been provided to the controller 3191 (step 606). Step 606 is skipped when the object need not be illuminated.

Then, commands to start photographing are given to the motor driving circuit 3150 and the image pickup control circuit 3120 respectively (step 607). Until the prescribed number of lines are scanned, data D320 on photographing are serially fed to an external device (steps 608 and 609). Then the operation of the line sensor 311 and motor 315 is suspended (step 610), and a command to suspend light emission is given to the controller 3191 (step 611).

Figure 30:
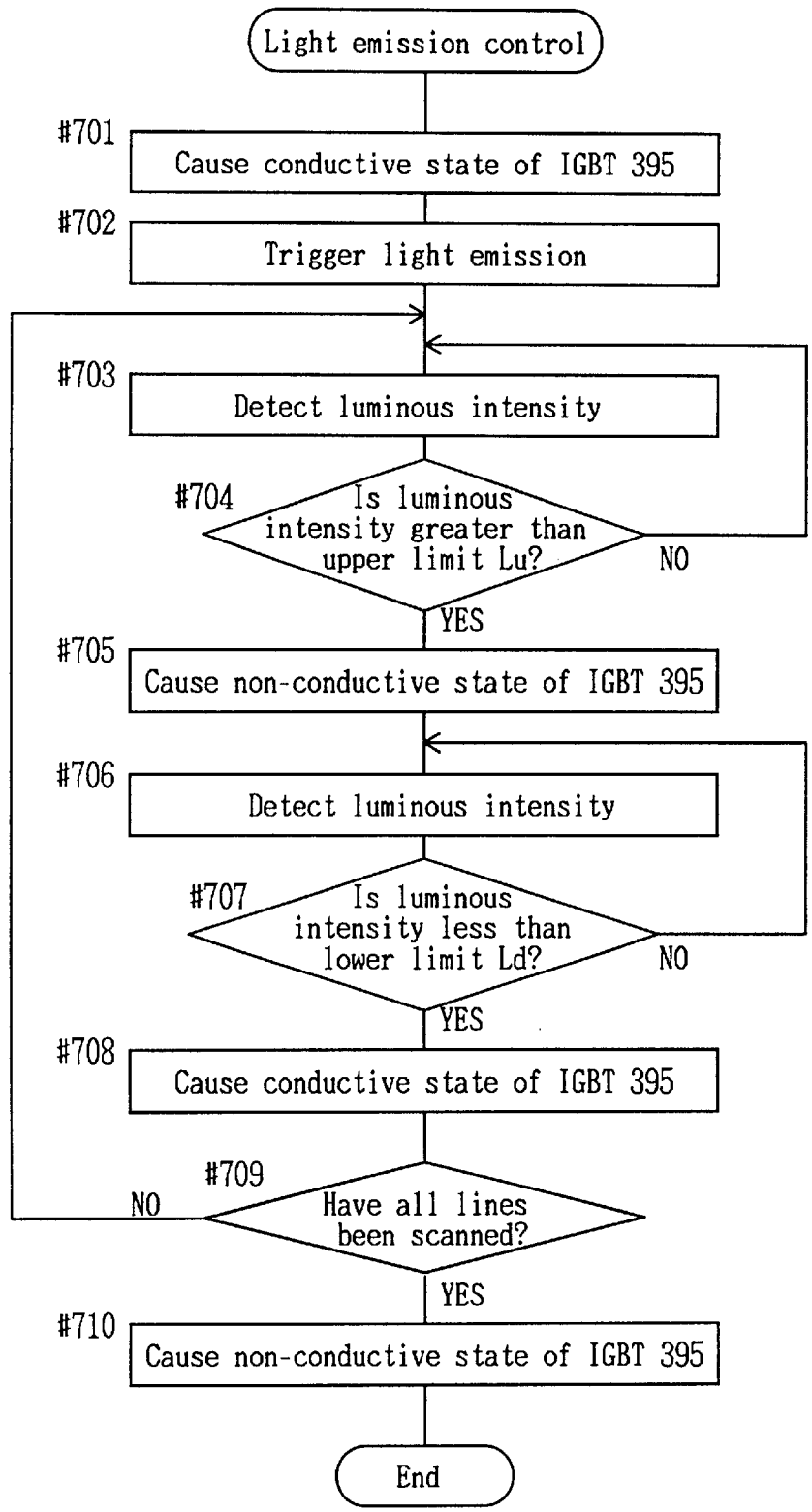
FIG. 30 is a flow diagram representing the manner in which the light emission control circuit of FIG. 27 works.

For a more complete understanding of the successive steps in a typical operation of the light emission control circuit 3190, reference may be had to FIG. 30.

In response to a command to start light emission, the IGBT 395 changes from non-conducting to conducting state (step 701). The trigger circuit 394 actuates the xenon lamp 392 to strike an arc therein (step 702). The IGBT 395 continues to be subjected to switching action until a command to suspend light emission is given to the controller 3191. The switching action is effected in accordance with the results of detection carried out by the photoelectric sensor 396 (steps 703 to 709). When a command to suspend light emission is provided from the CPU 371 to the controller 3191, the IGBT 395 changes from conducting to non-conducting state so as to provide standby conditions (step 710).

Figure 31:
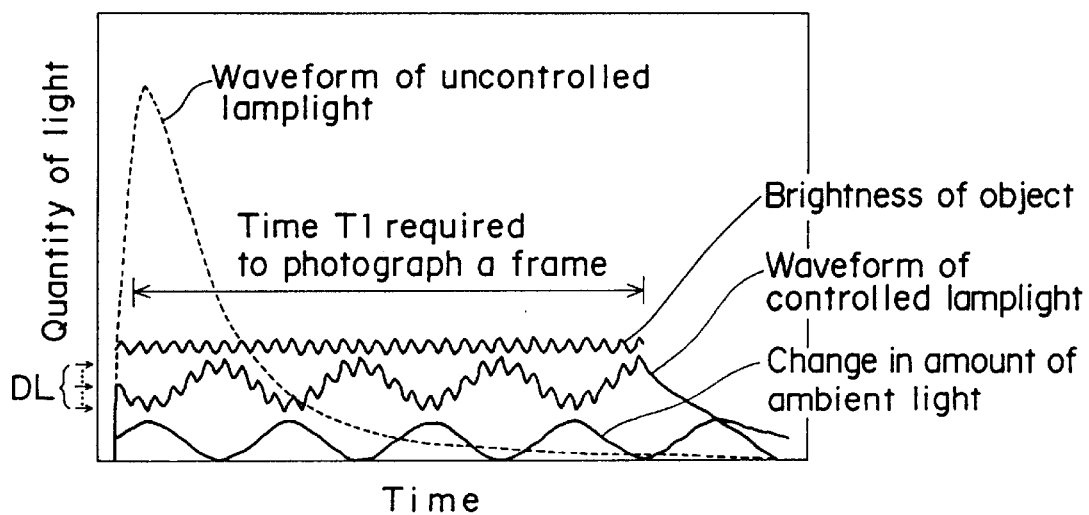
FIG. 31 is a waveform chart, illustrating the waveforms of signals developed in course of another example of control over light emission.

As will be seen by reference to FIG. 31, it is possible to provide a modified method of allowing the quantity of light actually emitted by the xenon lamp 392 to remain substantially constant.

In the method of FIG. 31, as distinguished from that of FIG. 28, the undesirable effect of a change in the quantity of ambient light caused by a flickering light source such as a fluorescent lamp is circumvented. Not only before the commencement of photographing but also during photographing, the brightness of the object is consecutively or serially measured by the photometric sensor 351. In order to keep the brightness of the object substantially constant throughout the photographing, a portion of the output of the photometric sensor 351 is fed back to the light emission unit 391. It will be understood that the circuitry shown in FIG. 27 may be employed for this feedback control. In this case, the set value DL is changed by the CPU 371 on a real-time basis in accordance with a change in the quantity of ambient light. Should the quantity of ambient light increase, the set value DL which was previously high will change to a low value. In case of a substantial decrease in the quantity of ambient light, the set value DL which was previously low will change to a high value. The set value DL represents a brightness which is approximately equivalent to the desired brightness of the object. In the quantity of light actually emitted by the xenon lamp 392, the output of the photometric sensor 351 is reflected indirectly through the controller 3191. Consequently, the brightness of the object can be kept constant even under the condition that the quantity of ambient light is changing. An excellent photograph uniform in brightness can be obtained.

Novelty is predicated on the aforesaid phase of the concept wherein, in accordance with a change in the Quantity of ambient light, the quantity of light actually emitted by the xenon lamp 392 is adjusted so as to allow all frames to have equal brightness. This phase of the concept is applicable to any other case where illumination should not be instantaneous but the required length of time should be obtained before the termination of light emission. For example, the invention may obviously be applied to the silver photography in which a thin scanning curtain is produced by a laser beam rapidly reciprocated in a horizontal direction. The invention may be applied also to a video camera incorporating an area sensor.

It will be appreciated that certain significant advantages are obtained from the digital cameras 1, 2 and 3 as follows: Longer time is not required for elimination of underexposure even under the condition of low illuminance on the surface of the object. A distinct improvement in S/N ratios results in high picture quality irrespective of the degree of illuminance on the surface of the object. The object is illuminated only when necessary. The importance of such limited illumination is particularly great on account of the saving of electric power and the elimination of overexposure. An excellent photograph uniform in brightness can be obtained irrespective as to whether or not the quantity of ambient light is changing. The following advantages are obtained from the digital cameras 1 and 2: Switching action for light emission is synchronized with the repetition of retrace intervals between successive lines. Consequently, the waveforms of light emission effected at all storage times are made uniform. This means that all lines receive an equal quantity of light. The line sensor and the light emission are controlled by identical pulses, i.e., retrace pulses $\phi$SG. Consequently, adverse influence exerted on picture quality by electromagnetic interference is minimized and the timing control circuit is allowed to be of simple design. Even if the existing lighting conditions inherently require a klieg light, a video camera incorporating an area sensor and embodying this invention obviates the necessity of the klieg light in so far as only a short time, e.g., several seconds are required for photographing.

As compared with an incandescent electric lamp, the xenon lamps 91, 291 and 392 require reduced amount of electrical energy during illumination cycles. The time interval between the manipulation of the release button and the commencement of photographing is shortened, because the amount of light emitted by the xenon lamps 91, 291 and 392 is stabilized in a short time after the commencement of light emission. The photosensors 96 and 396 disposed in the immediate vicinity of the xenon lamps 91 and 392 make it possible to detect and accurately monitor the amount of light emitted by these xenon lamps and thereby serve to stabilize the illumination.

Instead of the means for rotating the mirror 14, 214 or 314 used in the embodiments described, it is also possible to use an auxiliary scanning mechanism for displacing the line sensor 11, 211 or 311 in horizontal directions. Furthermore, the invention may obviously be applied to an area scanning digital camera incorporating an area sensor. In this case, the function of a pulse signal with which the retrace pulse $\phi$SG should be replaced is to synchronize the switching action for light emission with the repetition of intervals between successive frames.

When the incandescent electric lamp is used, a change in the amount of light emitted thereby may be controlled by producing a corresponding change in the supply voltage. Changes in the construction of the digital camera, electrical circuit and sequence of steps may be made without departing from the nature and principle of the invention.

From the foregoing, it will be understood that the present invention comprises novel digital cameras incorporating further advantages in addition to those herein described. One of these further advantages deriving from the use of the invention involves the fact that, by means thereof, it is possible to photograph at proper exposure under various lighting conditions.

What is claimed is:

1. An apparatus for obtaining a two-dimensional image of an object, the apparatus comprising:
   a light source for emitting light out of the apparatus to irradiate the object;
   an image sensor for photographing the object by sensing light reflected from the object, the reflected light including the emitted light;
   a scanning mechanism for scanning the object in sync with the photographing; and
   a controller for commencing photographing after lighting the light source in response to a request for the commencement of the photographing and for allowing the light source to go out after the termination of the photographing.

2. An apparatus as in claim 1, wherein the light source is incorporated in the apparatus.

3. An apparatus as in claim 1, wherein the controller controls light emission so as to allow the quantity of light actually emitted by the light source to remain substantially constant throughout the photographing.

4. An apparatus as in claim 3, further comprising a detector arranged to detect the quantity of light actually emitted by the light source and to provide an electrical output signal indicative of the quantity so as to allow the controller to control the light emission based on the electrical output signal.

5. An apparatus as in claim 1, wherein the controller controls light emission so as to allow the brightness of the object to remain substantially constant throughout the photographing.

6. An apparatus as in claim 5, further comprising a photometer arranged to detect the brightness of the object and to provide an electrical brightness signal indicative of the brightness of the object so that the quantity of light actually emitted by the light source is controlled on the basis of the electrical brightness signal.

7. An apparatus as in claim 1, wherein the image sensor is a line sensor.

8. An apparatus as in claim 1, wherein the scanning mechanism comprises a mirror and a motor for driving the same.

9. An apparatus as in claim 1, wherein the controller repeatedly turns on and off the light source in controlling the quantity of light actually emitted by the light source.

10. An apparatus for obtaining an image of an object, comprising:
an image pickup device adapted to periodically carry out a scan operation during photographing;
a light source for emitting light for irradiating the object; and
a controller for controlling the light source so as to allow it to provide a continuous illumination of the object during each scan operation carried out by the image pickup device.

11. An apparatus as in claim 10, wherein the light source is incorporated in the apparatus.

12. An apparatus as in claim 10, further comprising a timer operable such that the timer starts counting up when a signal which determines the time required for allowing the image pickup device to scan a line is received, when a time counted by the timer elapses to more than a set value, the controller determines an instant when light emission for a subsequent scan operation is to be commenced.

13. An apparatus as in claim 10, further comprising a detector arranged to detect the quantity of light actually emitted by the light source, wherein the controller causes the light source to provide substantially constant quantity of light emitted.

14. An apparatus as in claim 10, wherein the image pickup device is a line sensor.

15. An image input apparatus for scanning an object existing outside of the apparatus by means of an image pickup device and an intermittently driven scanning mechanism, comprising:
a light source for emitting light outside of the apparatus for irradiating the object; and
a controller for controlling the light source so as to allow it to emit light synchronously with a periodic scan operation carried out by the image pickup device, whereby an image of the object is picked up by the image pickup device while the light source emits light.

16. An image input apparatus as in claim 15, wherein the light source is incorporated in the apparatus.

17. An image input apparatus as in claim 16, wherein the luminance of the light source is varied to provide a substantially constant illumination of the object.

18. An image input apparatus as in claim 15, further comprising:
a detector arranged to detect the quantity of light actually emitted by the light source; and
the controller interrupting a circuit to the light source when a detected value obtained from the detector comes up to a set value.

19. An image input apparatus as in claim 15, further comprising:
a photometer arranged to measure the brightness of the object; and
wherein the controller receives a measure of brightness signal from the photometer and controls light emission from the light source so that the brightness of the object remains substantially constant throughout the photographing.

20. An image input apparatus as in claim 15, wherein the controller allows the light source to commence or terminate light emission during the time when the operation of the scanning mechanism is suspended.

21. An image input apparatus as in claim 15, wherein the controller causes the light source to emit substantially constant light during each scan operation.

22. An image input apparatus as in claim 15, wherein the image pickup device is a one-dimensional photoelectric transfer device.

23. An image input apparatus as in claim 22, wherein the controller controls light emission by the light source synchronously with signals that determine the time required for the image pickup device to scan a line.

24. An image input apparatus as in claim 22, wherein the scanning mechanism causes the one-dimensional photoelectric transfer device to scan in a horizontal direction with respect to the object.

25. An image input apparatus as in claim 15, wherein the image pickup device is a two-dimensional photoelectric transfer element.

26. An image input apparatus as in claim 15, wherein the controller energizes the light source during the time when image information is not read out of the image pickup device.

27. An image input apparatus as in claim 26, wherein the controller interrupts a circuit to the light source during the time between periodic scan operations.

28. An image input apparatus as in claim 15, further comprising a detector arranged to detect a position of the scanning mechanism.

29. An image input apparatus as in claim 28, wherein the controller determines an instant when light emission is to be commenced by the light source and determines an instant when scan operation for each line is to be commenced by the image pickup device in response to a signal provided by the detector.

30. An image input apparatus as in claim 15, wherein the scanning mechanism includes a rotating mirror that directs incident light from the object to the image pickup device.

31. An image input apparatus as in claim 30, wherein the rotational speed of the mirror is controlled to provide a constant scanning speed of the surface of the object.

32. A method of obtaining a two-dimensional image of an object by means of an image sensor and a scanning mechanism, comprising the steps of:

provided a light source for emitting light for irradiating an object to be photographed;

lighting the light source in response to a request for the commencement of photographing;

commencing photographing by positioning the scanning mechanism in a plurality of positions such that the image sensor captures a plurality of components of the two-dimensional image of the object during the photographing;

terminating photographing; and allowing the light source to go out, wherein the light source provides a substantially continuous light during the photographing.

33. A method as in claim 32, wherein the quantity of light emitted by the light source is substantially constant throughout the photographing.

34. A method as in claim 33, wherein the step of commencing photographing includes detecting the quantity of light actually emitted by the light source and providing an electrical output signal indicative of the quantity so that light emission from the light source is controlled in response to the electrical output signal.

35. A method as in claim 32, wherein the light emitted by the light source is controlled so that the brightness of the object remains substantially constant throughout the photographing.

36. A method as in claim 35, wherein the step of commencing photographing includes detecting the brightness of the object and providing an electrical output signal indicative of the brightness of the object and controlling the quantity of light emitted by the light source in response to the electrical output signal.

37. A method as in claim 32, wherein the image sensor is a line sensor.

38. A method as in claim 32, wherein the scanning mechanism comprises a mirror and a motor for driving the mirror.

39. A method as in claim 32, wherein the step of commencing photographing includes repeatedly turning on and off the light source to control the quantity of light emitted by the light source.

40. An apparatus as in claim 3, further comprising a scanning controller for positioning the scanning mechanism in a plurality of positions such that the image sensor captures a plurality of components of the two-dimensional image of the object during the photographing.

41. An imaging apparatus comprising:

a light source for emitting light to irradiate an object external to the apparatus;

an image pickup device for capturing an image of a part of the object;

a scanning mechanism for intermittently changing the part of the object to be captured by the image pickup device; and a controller for controlling the light source, the image pickup device and the scanning mechanism so that the image pickup device captures the imaging at each changing of the scanning mechanism and the light source emits light at each capturing of the image of a part of the object by the pickup device.

* * * * *